United States Patent
Yang et al.

(10) Patent No.: US 11,682,973 B2
(45) Date of Patent: Jun. 20, 2023

(54) ADVANCED CONSTANT OFF-TIME CONTROL FOR FOUR-SWITCH BUCK-BOOST CONVERTER

(71) Applicant: M3 Technology Inc., Taipei (TW)

(72) Inventors: Bo Yang, Allen, TX (US); Xiaoyu Xi, Dallas, TX (US); David Meng, Los Altos, CA (US)

(73) Assignee: M3 Technology Inc., Taipei (TW)

( * ) Notice: Subject to any disclaimer, the term of this patent is extended or adjusted under 35 U.S.C. 154(b) by 0 days.

(21) Appl. No.: 17/378,111

(22) Filed: Jul. 16, 2021

(65) Prior Publication Data

US 2021/0359605 A1    Nov. 18, 2021

Related U.S. Application Data

(63) Continuation of application No. 16/747,781, filed on Jan. 21, 2020, now Pat. No. 11,121,632, which is a continuation of application No. 16/273,297, filed on Feb. 12, 2019, now Pat. No. 10,651,722, which is a continuation-in-part of application No. 16/000,757, filed on Jun. 5, 2018, now Pat. No. 10,250,142.

(60) Provisional application No. 62/649,328, filed on Mar. 28, 2018.

(51) Int. Cl.
H02M 3/158     (2006.01)
H02M 3/157     (2006.01)
H02M 1/088     (2006.01)

(52) U.S. Cl.
CPC ......... H02M 3/1582 (2013.01); H02M 1/088 (2013.01); H02M 3/157 (2013.01)

(58) Field of Classification Search
CPC .. H02M 3/1582; H02M 3/1584; H02M 3/156; H02M 3/1588
See application file for complete search history.

(56) References Cited

U.S. PATENT DOCUMENTS

| | | |
|---|---|---|
| 7,154,250 B2 * | 12/2006 | Vinciarelli .......... H02M 3/1582 323/239 |
| 8,018,212 B1 | 9/2011 | Petricek |
| 9,722,485 B2 | 8/2017 | Mikami et al. |
| 2006/0284606 A1 | 12/2006 | Chen et al. |
| 2007/0085519 A1 | 4/2007 | Xu |
| 2009/0251122 A1 | 10/2009 | Singnurkar |
| 2011/0199062 A1 | 8/2011 | Singnurkar |
| 2011/0279098 A1 | 11/2011 | Ren et al. |
| 2012/0105030 A1 | 5/2012 | Chen et al. |
| 2014/0217996 A1 | 8/2014 | Peker et al. |

* cited by examiner

*Primary Examiner* — Nguyen Tran
(74) *Attorney, Agent, or Firm* — Li Li

(57) ABSTRACT

An apparatus includes a first timer configured to determine a turn-off time of a first high-side switch of a buck-boost converter, and a second timer configured to determine a turn-off time of a second low-side switch of the buck-boost converter based on a comparison between a first signal and a second signal, the first signal being proportional to an input voltage of the buck-boost converter, and the second signal being generated based on a signal proportional to an output voltage of the buck-boost converter.

20 Claims, 30 Drawing Sheets

ADVANCED CONSTANT OFF-TIME CONTROL FOR FOUR-SWITCH BUCK-BOOST CONVERTER

CROSS REFERENCE TO RELATED APPLICATIONS

This application is a continuation of U.S. patent application Ser. No. 16/747,781, filed Jan. 21, 2020, and entitled "Advanced Constant Off-Time Control for Four-Switch Buck-Boost Converter," which is a continuation of U.S. patent application Ser. No. 16/273,297, filed Feb. 12, 2019, now U.S. Pat. No. 10,651,722, and entitled "Advanced Constant Off-Time Control for Four-Switch Buck-Boost Converter," which is a continuation-in-part of U.S. patent application Ser. No. 16/000,757, filed Jun. 5, 2018, now U.S. Pat. No. 10,250,142, and entitled "Advanced Constant Off-Time Control for Four-Switch Buck-Boost Converter," which claims priority to U.S. Provisional Application Ser. No. 62/649,328, entitled "Advanced Constant Off-Time Control Four-switch BUCKBOOST Converter," which was filed on Mar. 28, 2018, all of which are incorporated herein by reference.

TECHNICAL FIELD

The disclosure generally relates to power converters.

BACKGROUND

As electronics devices move toward portable and mobile, battery becomes the major power source. However, due to characteristics of batteries, an output voltage of a battery pack could vary in a wide range between a fully charged state and a fully depleted state. Depending on the state of a battery, a charging voltage could be higher or lower than the battery voltage.

In addition, as USB Type C begins infiltrate the major market, voltage from a USB port is no longer fixed at 5 V, and could vary in a wide range between 3.5 V and 20 V. In the meanwhile, downstream devices connected to such type of USB port may still need a voltage substantially around 5 V, or close to the middle of 3.5 V to 20 V.

In all these situations, input voltage and output voltage of a power converter of an electronics device may crossover during a normal operation. Traditional BUCK (step down) converter or BOOST (step up) converter can only work with Input voltage either higher or lower, respectively, than output voltage. Thus, four-switch BUCKBOOST converter becomes the choice due to its flexibility with input and output voltage ranges.

A traditional control method for a BUCKBOOST converter is shown in FIG. 1. In the BUCKBOOST converter, all four switches are turned on and off once in every switching cycle. Also, energy of input power source is never transferred directly to an output. Instead, energy of input power source needs to be stored in an inductor, and then passed on to the output. Thus, efficiency of the traditional BUCKBOOST converter is low. Further, the traditional BUCKBOOST has a high cost due to the need for high current rating devices. Other control methods based on peak current mode (PCM) or voltage mode (VM) control have also been used in controlling four-switch BUCKBOOST. However, all these control methods are based on fixed frequency control with clock signal to determine the timing of four switches.

Therefore, a new method is desired to control a four-switch BUCKBOOST converter.

SUMMARY

In particular embodiments, a control scheme may achieve fast transient responses and improve the performance of a four-switch BUCKBOOST converter under a variety of operating conditions.

Systems and methods, in accordance with various examples of the present disclosure, provide a solution to the above-mentioned problems by managing a four-switch BUCKBOOST converter with a combination of a Constant Off-time (COT) control and a Peak Current Mode (PCM) control. With the COT control, the four-switch BUCK-BOOST converter can automatically and smoothly transition between a BUCK mode, a BUCKBOOST mode, and a BOOST mode when input voltage varies. In some implementations, the four-switch BUCKBOOST converter only requires a simple, low-power-consumption and robust system control loop compensation with the PCM control for inductor current, and, thus, eliminates the need for oscillator and slope compensation circuit. The PCM control is used to determine turn-off-timing of switches of the four-switch BUCKBOOST converter. The system control loop compensation can provide cycle-by-cycle current limit function to protect the converter and load from over-current damages.

In some implementations, timing of switches of the four-switch BUCKBOOST converter is determined by an off-time calculation circuit using peak current information. Thus, the present disclosure eliminates the need for a fixed clock signal in conventional four-switch BUCKBOOST converters.

In some implementations, the four-switch BUCKBOOST converter can automatically transition from a pulse-width modulation (PWM) to a pulse-frequency modulation (PFM) with the COT control. As a result, the four-switch BUCK-BOOST converter does not require a slope compensation that is required for a PCM control, and, thus, greatly simplifies control circuit and current consumption. In some implementations, with the PCM control, the system control loop compensation can be further simplified by reducing output double pole of inductor and output capacitor to single pole response.

In accordance with one aspect of the present disclosure, a computer-implemented method for managing a four-switch BUCKBOOST converter of a system with a combination of a Constant Off-time (COT) control and a Peak Current Mode (PCM) control, comprises: determining input voltage (VIN) and output voltage (VOUT) of the four-switch BUCK-BOOST converter; in an event that VIN is greater than a first threshold voltage, enabling a BUCK mode for the four-switch BUCKBOOST converter; in an event that VIN is lower than a second threshold voltage, enabling a BOOST mode for the four-switch BUCKBOOST converter; and in an event that VIN is between the second threshold voltage and the first threshold voltage, enabling a BUCKBOOST mode for the four-switch BUCKBOOST converter.

In accordance with an embodiment, an apparatus comprises a first timer configured to determine a turn-off time of a first high-side switch of a buck-boost converter, and a second timer configured to determine a turn-off time of a second low-side switch of the buck-boost converter based on a comparison between a first signal and a second signal, the first signal being proportional to an input voltage of the buck-boost converter, and the second signal being generated based on a signal proportional to an output voltage of the buck-boost converter.

In accordance with another embodiment, an apparatus comprises a first timer configured to determine a turn-off time of a first high-side switch of a buck-boost converter, a second timer configured to determine a turn-off time of a second low-side switch of the buck-boost converter, and an operation mode control unit comprising a first comparator and a second comparator, wherein an output of the first comparator configures the buck-boost converter to operate in a buck mode, an output of the second comparator configures the buck-boost converter to operate in a boost mode, and a combination of the output of the first comparator and the output of the second comparator configures the buck-boost converter to operate in a buck-boost mode.

In accordance with yet another embodiment, a method comprises determining a turn-off time of a first high-side switch of a buck-boost converter based on a comparison between a first ramp and a first threshold voltage, wherein the first ramp is generated based on a first current source having a current level proportional to an input voltage of the buck-boost converter, and the first threshold voltage is proportional to a difference between the input voltage and an output voltage of the buck-boost converter, and determining a turn-off time of a second low-side switch of the buck-boost converter based on a comparison between a second ramp and a second threshold voltage, wherein the second ramp is generated based on a second current source having a current level proportional to the output voltage of the buck-boost converter, and the second threshold voltage is proportional to the input voltage of the buck-boost converter.

An advantage of a preferred embodiment of the present disclosure is improving the performance of a buck-boost power converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
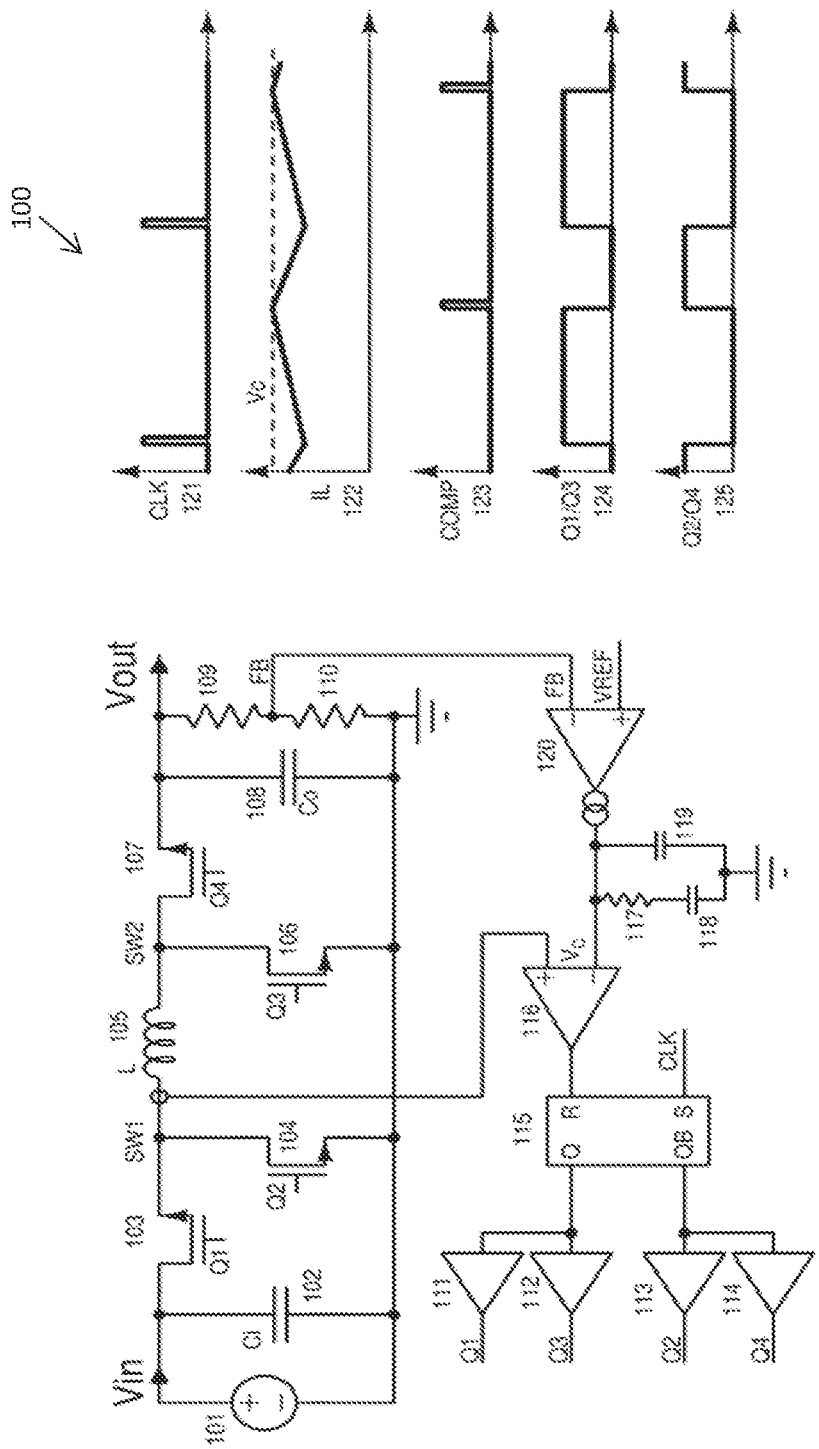
FIG. 1 illustrates a conventional control method for a four-switch BUCKBOOST converter.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Various examples of the present disclosure provide systems and methods for managing a four-switch BUCK-BOOST converter with a combination of a Constant Off-time (COT) control and a Peak Current Mode (PCM) control. With the COT control, the four-switch BUCK-BOOST converter can automatically and smoothly transition between a BUCK mode, a BUCKBOOST mode, and a BOOST mode when input voltage varies. The PCM control is used to determine turn-off-timing of switches of the four-switch BUCKBOOST converter.

Figure 2:
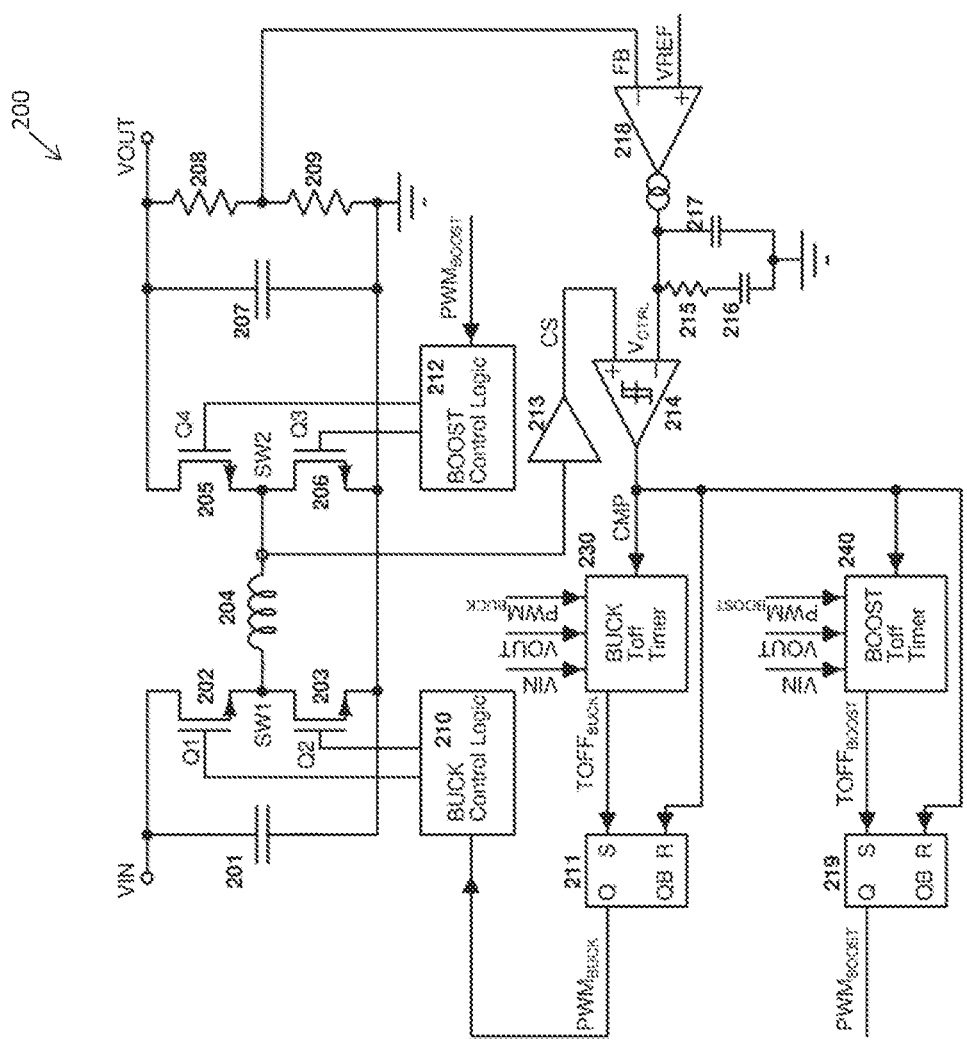
FIG. 2 illustrates an exemplary Constant Off-Time (COT) BUCKBOOST control method for an exemplary COT BUCKBOOST converter, in accordance with an implementation of the present disclosure.

FIG. 2 illustrates an exemplary Constant Off-Time (COT) BUCKBOOST control method for an exemplary COT BUCKBOOST converter 200, in accordance with an implementation of the present disclosure. In this example, the converter 200 comprises four switches Q1 202, Q2 203, Q3 206 and Q4 205, a voltage error amplifier 218, a peak current comparator 214, a BUCK $T_{off}$ timer 230, a BUCK control logic 210 coupled to the BUCK $T_{off}$ timer 230, a BOOST $T_{off}$ timer 240, and a BOOST control logic 212 coupled to the BOOST $T_{off}$ timer 240. In some implementations, the four switches Q1 202, Q2 203, Q3 206 and Q4 205 are power metal-oxide-semiconductor field-effect transistors (MOSFETs). Q1 202 and Q4 205 are high side power MOSFETs, respectively, while Q2 203 and Q3 206 are low side power MOSFETs, respectively.

Figure 3:
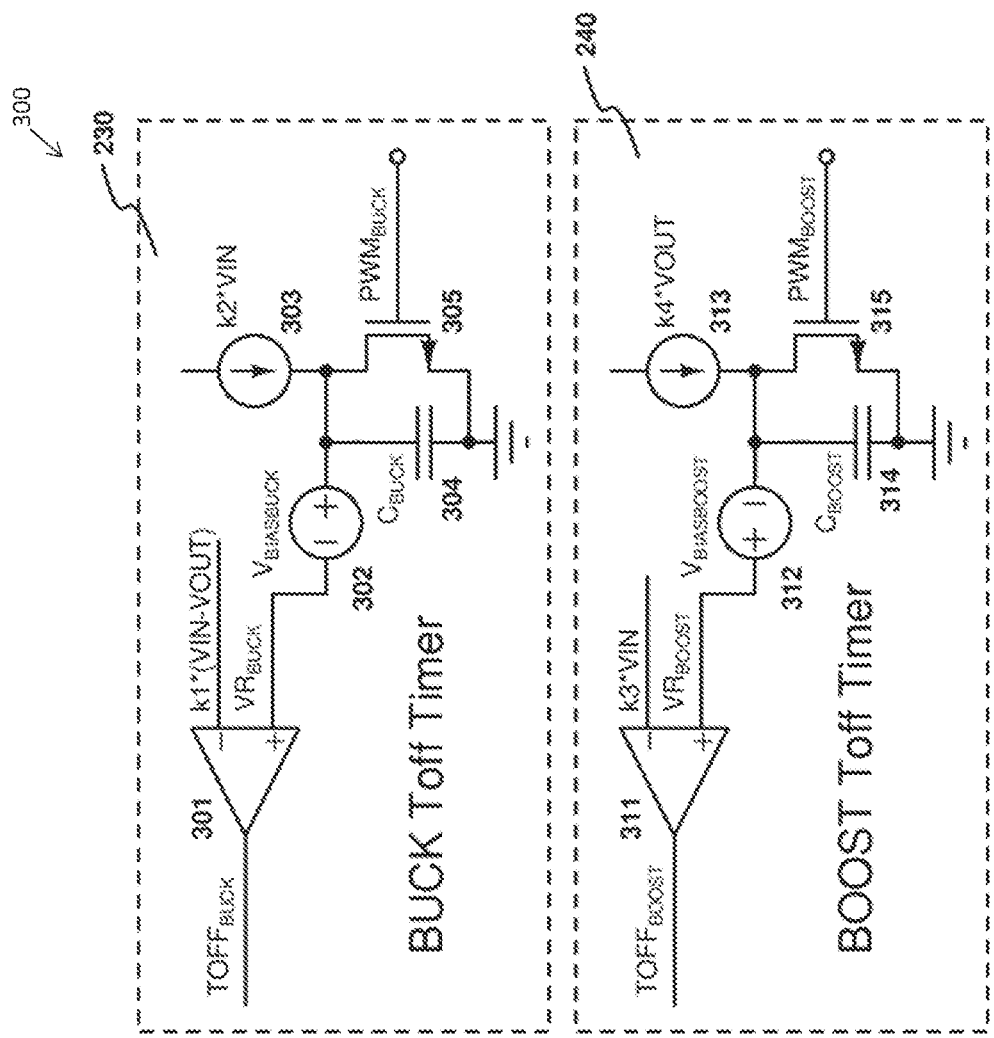
FIG. 3 illustrates an exemplary BUCK $T_{off}$ Timer and BOOST $T_{off}$ Timer of the exemplary COT BUCKBOOST converter in FIG. 2, in accordance with an implementation of the present disclosure.

The BUCK $T_{off}$ timer 230 and the BOOST $T_{off}$ time 240 are configured to calculate off time for each corresponding power switch of the converter 200, which is further illustrated in FIG. 3. As shown in FIG. 3, the timer (e.g., 230 or 240) can generate a reference voltage (e.g., $VR_{BUCK}$ or $VR_{BOOST}$) and a charging current source (e.g., 303 or 313) based on Vin and Vout. The BUCK $T_{off}$ timer 230 comprises a capacitor 304 and a comparator 301 while the BOOST $T_{off}$ timer 240 comprises a capacitor 314 and a comparator 311. Thus, the BUCK $T_{off}$ timer 230 and the BOOST $T_{off}$ time 240 can calculate an off time of BUCK switches (e.g., Q1 202 and Q2 203) and BOOST switches (e.g., Q3 206 and Q4 205), respectively, as follows:

$$T_{OFFBUCK} = C_{BUCK} \cdot \frac{k1 \cdot (VIN - VOUT) + V_{BIASBUCK}}{k2 \cdot VIN}$$

$$T_{OFFBOOST} = C_{BOOST} \cdot \frac{k3 \cdot VIN - V_{BIASBOOST}}{k4 \cdot VOUT}$$

In the above equations, k1 and k3 are voltage scaling factors while k2 and k4 are voltage to current scaling factors. By choosing different scaling factors, $T_{OFFBUCK}/T_{OFFBOOST}$ and corresponding switching frequency can be adjusted.

In this example, the BUCK $T_{off}$ timer 230 further comprises a bias voltage $V_{BIASBUCK}$ while the BOOST $T_{off}$ timer 240 further comprises a bias voltage $V_{BIASBOOST}$, in order to achieve automatic transition between a BUCK mode, a BUCKBOOST mode, and a BOOST mode. When VIN of the converter 200 is much higher than VOUT of the converter 200, $T_{OFFBOOST}$ is much longer than a switching period of the converter 200 such that Q4 205 is always on. In this scenario, $T_{OFFBUCK}$ could be determined according the above equation while the converter 200 operates in the BUCK mode. When working in the BUCK mode, the BOOST Toff timer 240 is never triggered. Q3 is in OFF state and Q4 is in ON state at all time. A current sensing amplifier 213 is configured to detect switch current of Q1 202. Off time of Q1 202 is determined based upon a time when output of the current sensing amplifier 213 reaches the control voltage $V_{ctrl}$ of the comparator 214. After Q1 202 turns off, the BUCK $T_{off}$ timer 230 starts to count. Once the BUCK Toff timer 230 triggers, Q1 202 is turned on again to start another cycle.

As VIN drops and gets close to VOUT, $T_{OFFBOOST}$ will reduce due to offset voltage $V_{BIASBOOST}$, even when VIN is still higher than VOUT. When $T_{OFFBOOST}$ reduces to a threshold level, Q4 205 will start to turn off and Q3 206 turns on. Now, the converter 200 starts to work in the BUCK-BOOST mode. While in the BUCKBOOST mode, Q1 202 and Q3 206 are initially in ON state. Current of inductor 204 ramps up by VIN. The current sensing amplifier 213 is configured to detect current of inductor 204. When output of the current sensing amplifier 213 reaches the control voltage $V_{ctrl}$, both Q1 202 and Q3 206 will be turned off and Q2 203 and Q4 205 will be turned on. Now, both the BUCK $T_{off}$ timer 230 and the BOOST $T_{off}$ timer 240 will start to count. In this scenario, $T_{OFFBUCK}$ is much smaller than $T_{OFFBOOST}$. Initially, the BUCK $T_{off}$ timer 230 will be triggered, which turns off Q2 203 and turns on Q1 202. After a wait time close to a switching cycle, the BOOST $T_{off}$ timer 240 is triggered, which turns off Q4 205 and turns on Q3 206. Then, another switch cycle starts to repeat.

As VIN continues dropping below VOUT to a point when $k1 \cdot (VIN-VOUT)+V_{BIASBUCK}$ is less than $k2 \cdot VIN$, $T_{OFFBUCK}$ will reduce to zero. Then, Q1 202 will be on all the time. The converter 200 starts to work in the BOOST mode. In the BOOST mode, the BUCK $T_{off}$ timer 230 is always in a trigger state because VIN−VOUT is negative, which keeps Q1 202 in ON state while keeps Q2 203 in OFF state all the time.

Figure 4A:
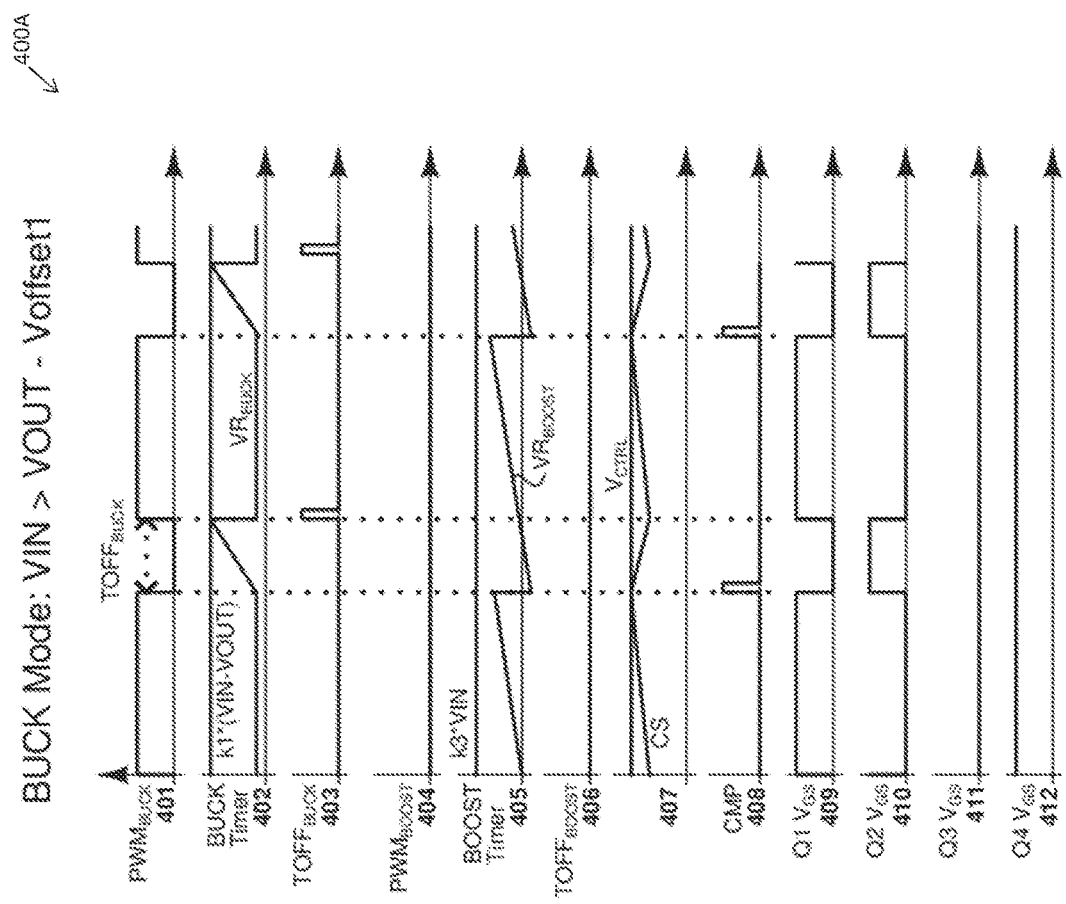
FIGS. 4A-4C illustrate waveforms of the exemplary COT BUCKBOOST converter in FIG. 2, in accordance with an implementation of the present disclosure.
Figure 4B:
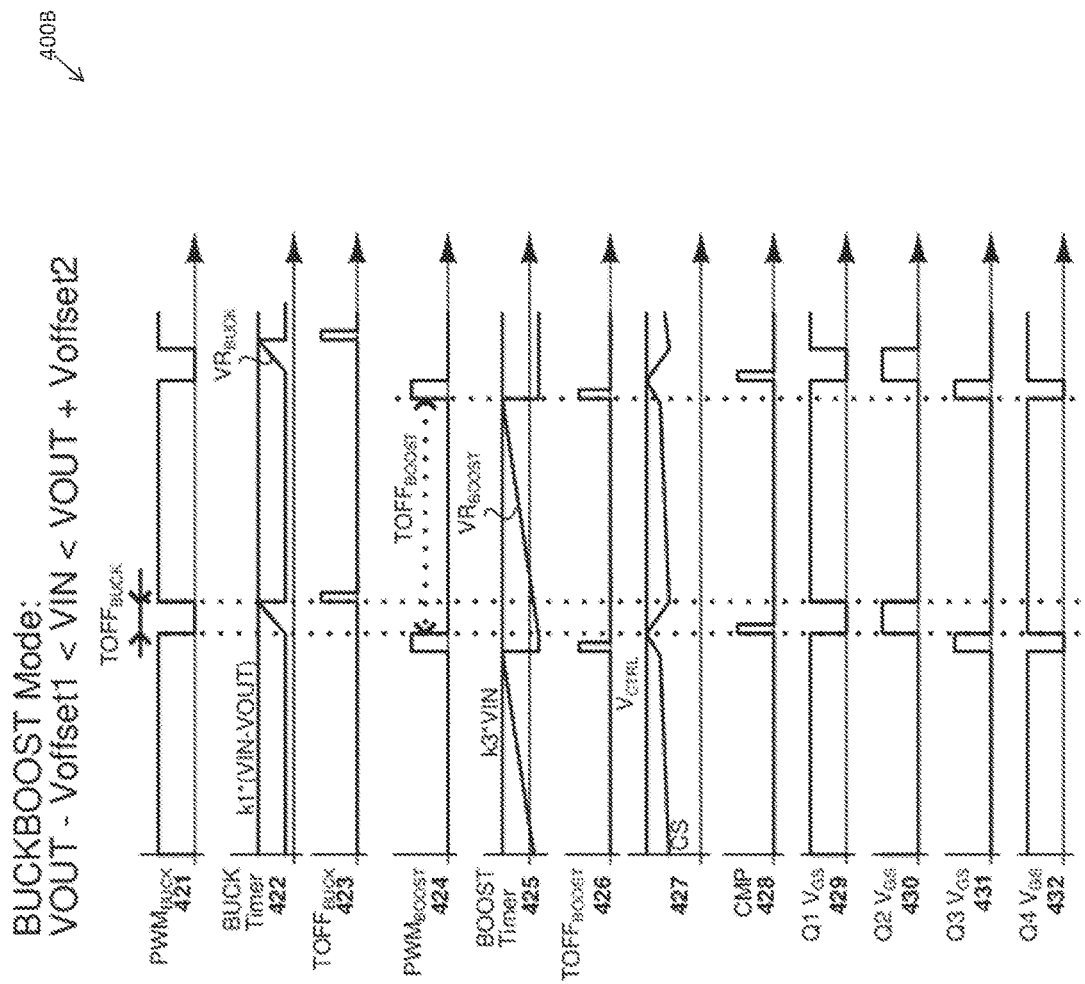
Figure 4C:
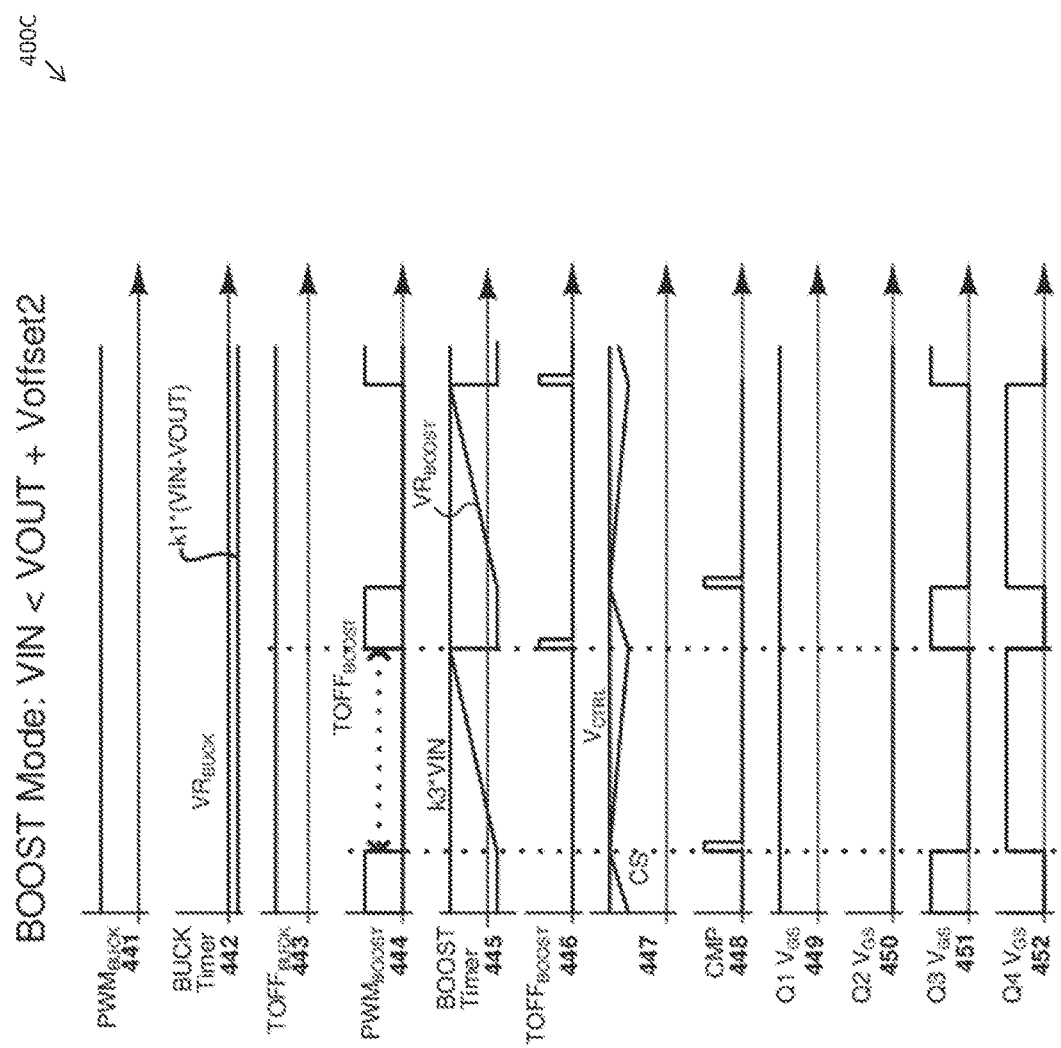

FIGS. 4A-4C illustrate waveforms of the exemplary COT BUCKBOOST converter 200 in FIG. 2, in accordance with an implementation of the present disclosure. As shown in FIGS. 4A-4C, the converter 200 can adjust its operation mode based upon calculated off time of the BUCK Toff timer 230 and the BOOST Toff timer 240. The transition between a BUCK mode, a BUCKBOOST mode, and a BOOST mode can be automatic and seamless.

In some implementations, the BUCK Toff timer 230 and the BOOST Toff timer 240 are matched with each other. For example, the parameters in the BUCK $T_{off}$ timer 230 and the BOOST Toff timer 240 can be substantially correlated or matched as $$C_{BUCK} \cdot \frac{k1}{k2} = C_{BOOST} \cdot \frac{k3}{k4}.$$

Thus, the switching frequency in both BUCK mode and BOOST mode can be kept the constant.

Figure 5:
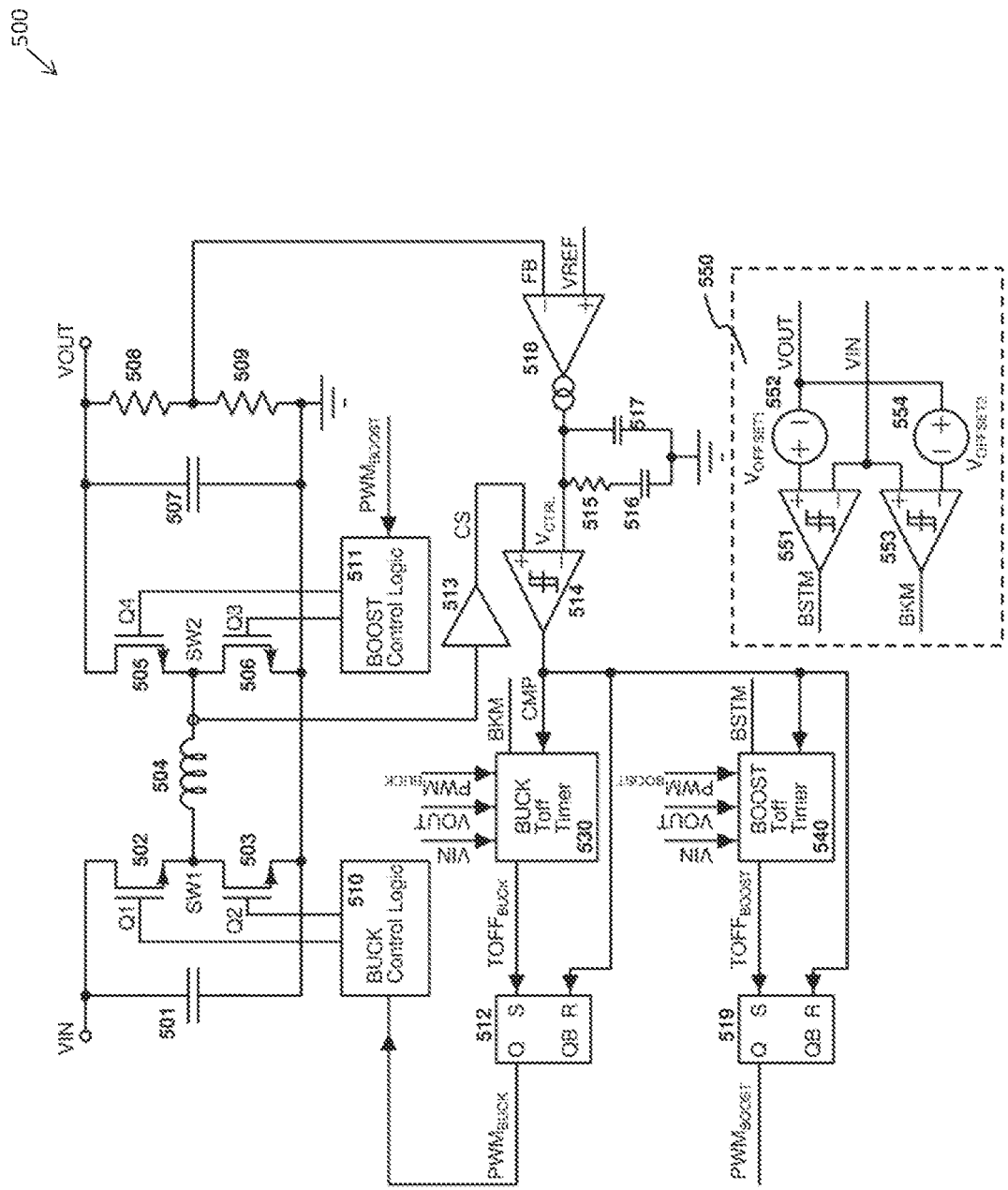
FIG. 5 illustrates another exemplary Constant Off-Time (COT) BUCKBOOST control method for an exemplary COT BUCKBOOST converter, in accordance with an implementation of the present disclosure.
Figure 6:
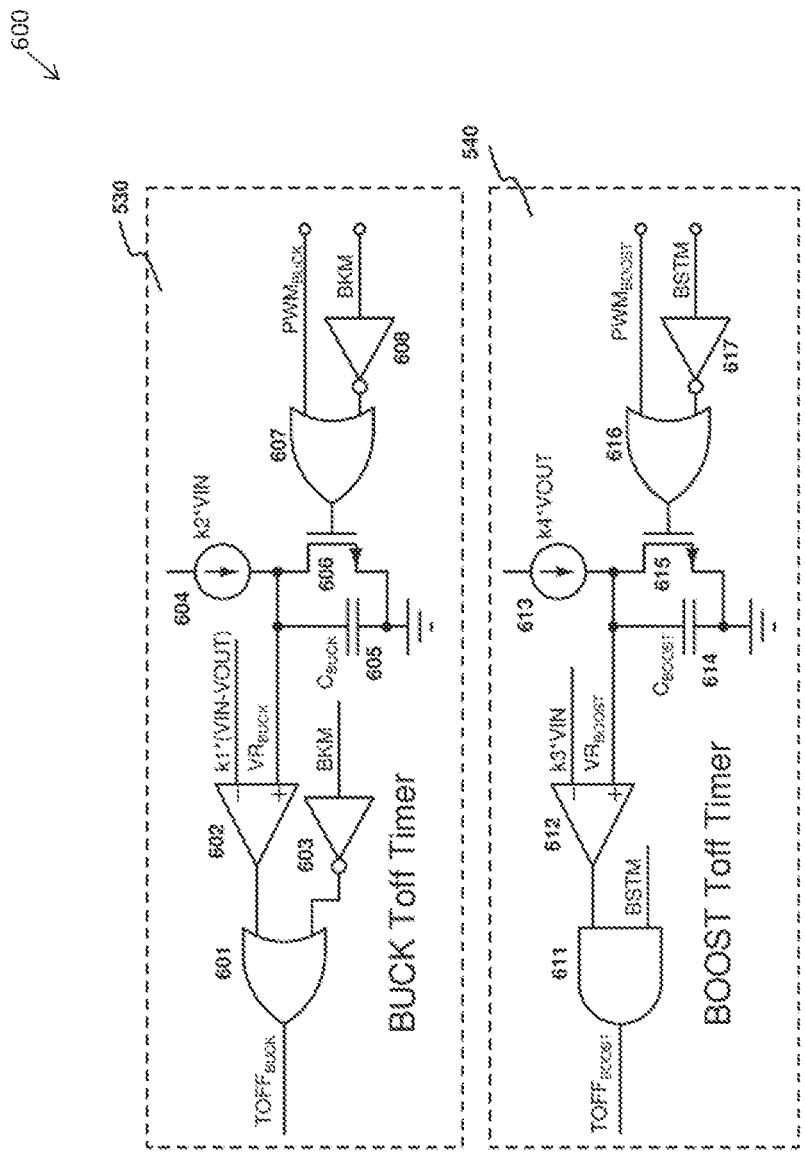
FIG. 6 illustrates another exemplary BUCK $T_{off}$ Timer and BOOST $T_{off}$ Timer of the exemplary COT BUCKBOOST converter in FIG. 5, in accordance with an implementation of the present disclosure.

FIG. 5 illustrates another exemplary Constant Off-Time (COT) BUCKBOOST control method for an exemplary COT BUCKBOOST converter 500, in accordance with an implementation of the present disclosure. In this example, the converter 500 comprises four switches Q1 502, Q2 503, Q3 506 and Q4 505, a BUCK Toff timer 530, a BUCK control logic 510 coupled to the BUCK $T_{off}$ timer 530, a BOOST Toff timer 540, a BOOST control logic 511 coupled to the BOOST $T_{off}$ timer 540, a voltage error amplifier 518, a peak current comparator 514, and comparators 551 and 553. The BUCK Toff timer 530 and the BOOST Toff timer 540 are further illustrated in FIG. 6. The comparators 551 and 553 are used to determine an operation mode of the converter 500 based upon relationship between VIN and VOUT. The characteristics of these two comparators 551 and 553 are illustrated in FIG. 7.

Figure 7:
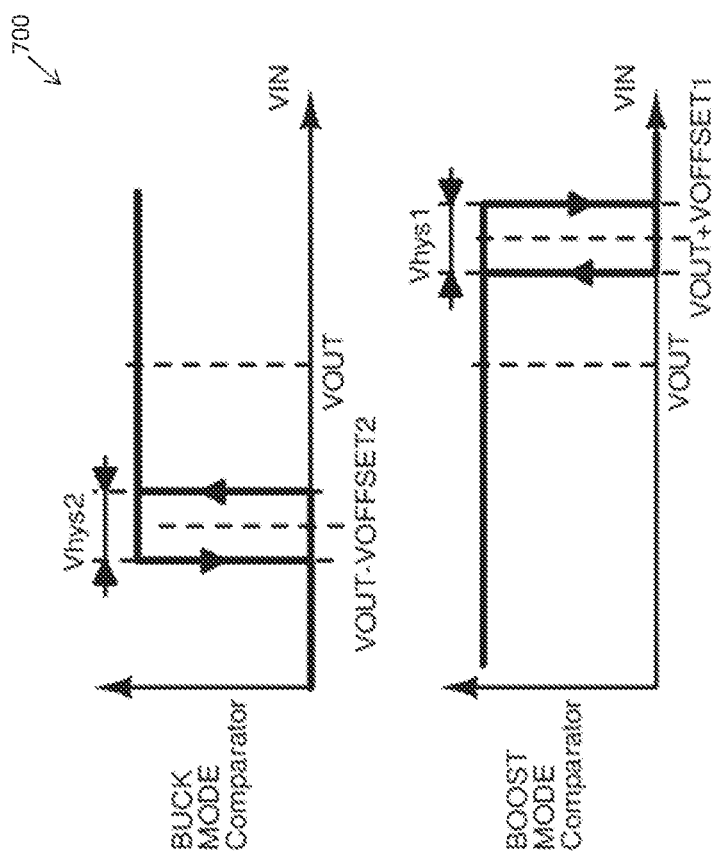
FIG. 7 illustrates an exemplary mode comparator state diagram of the exemplary COT BUCKBOOST converter in FIG. 5, in accordance with an implementation of the present disclosure.
Figure 8A:
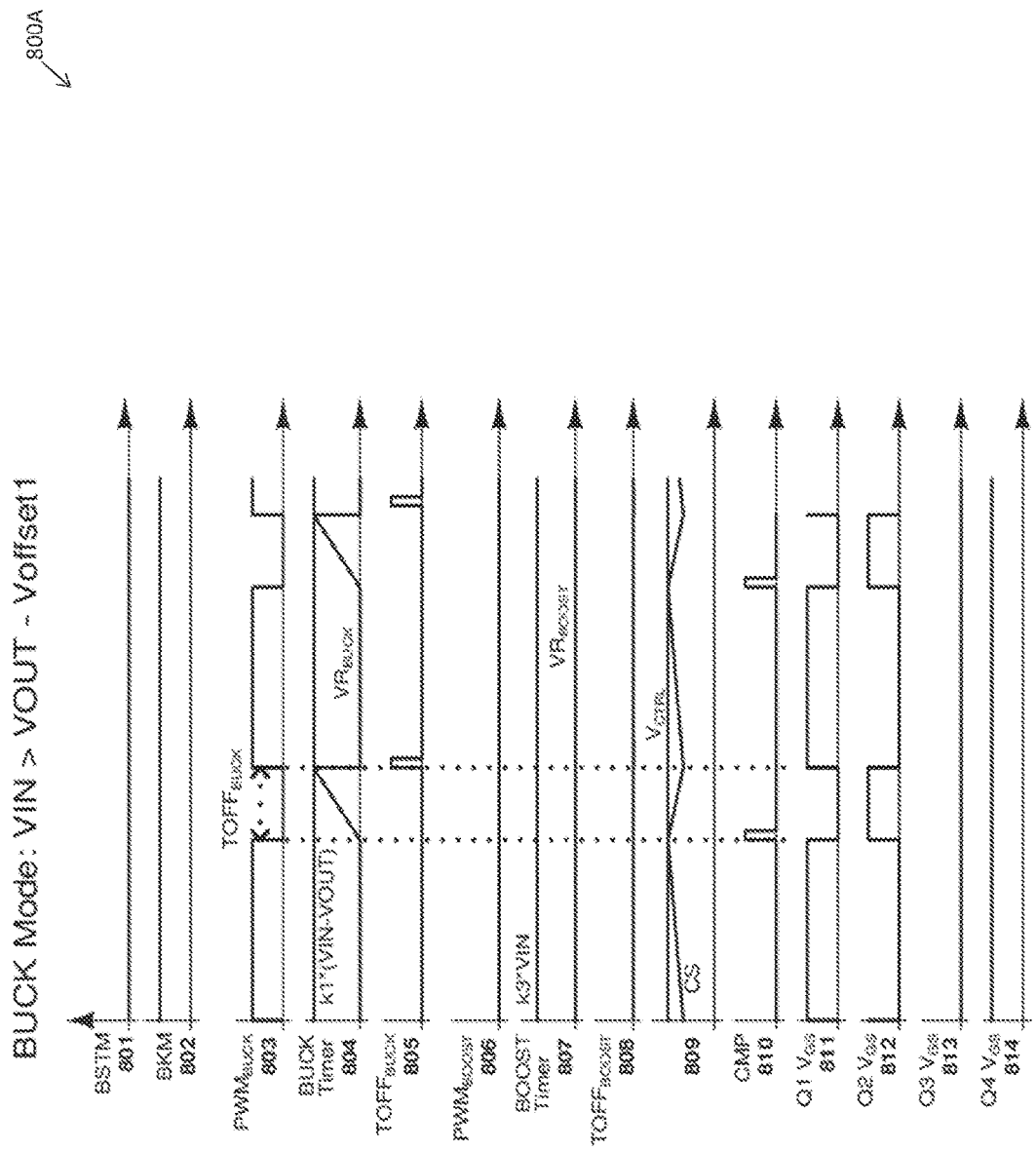
FIGS. 8A-8C illustrate waveforms of the exemplary COT BUCKBOOST converter in FIG. 5, in accordance with an implementation of the present disclosure.
Figure 8B:
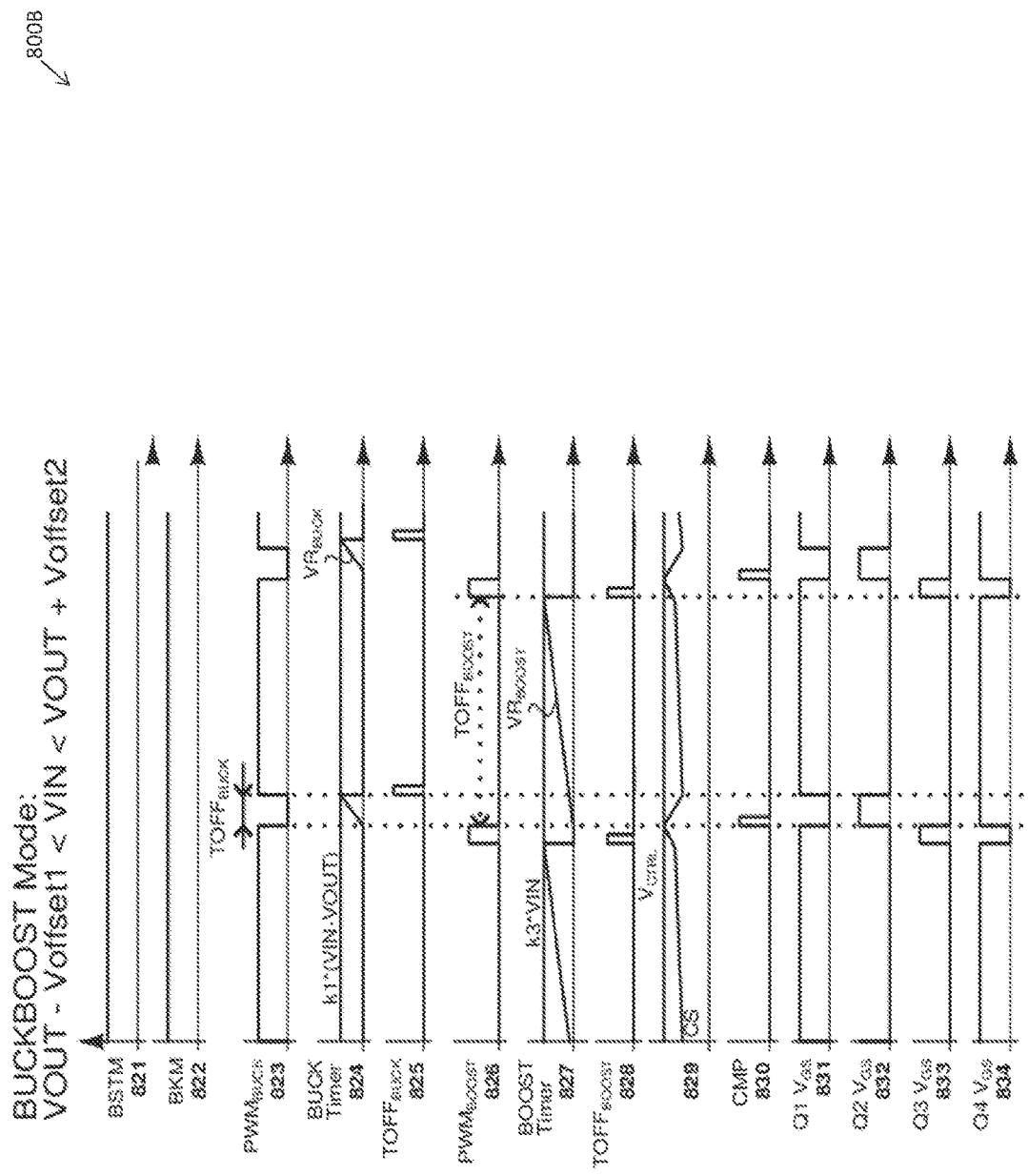
Figure 8C:
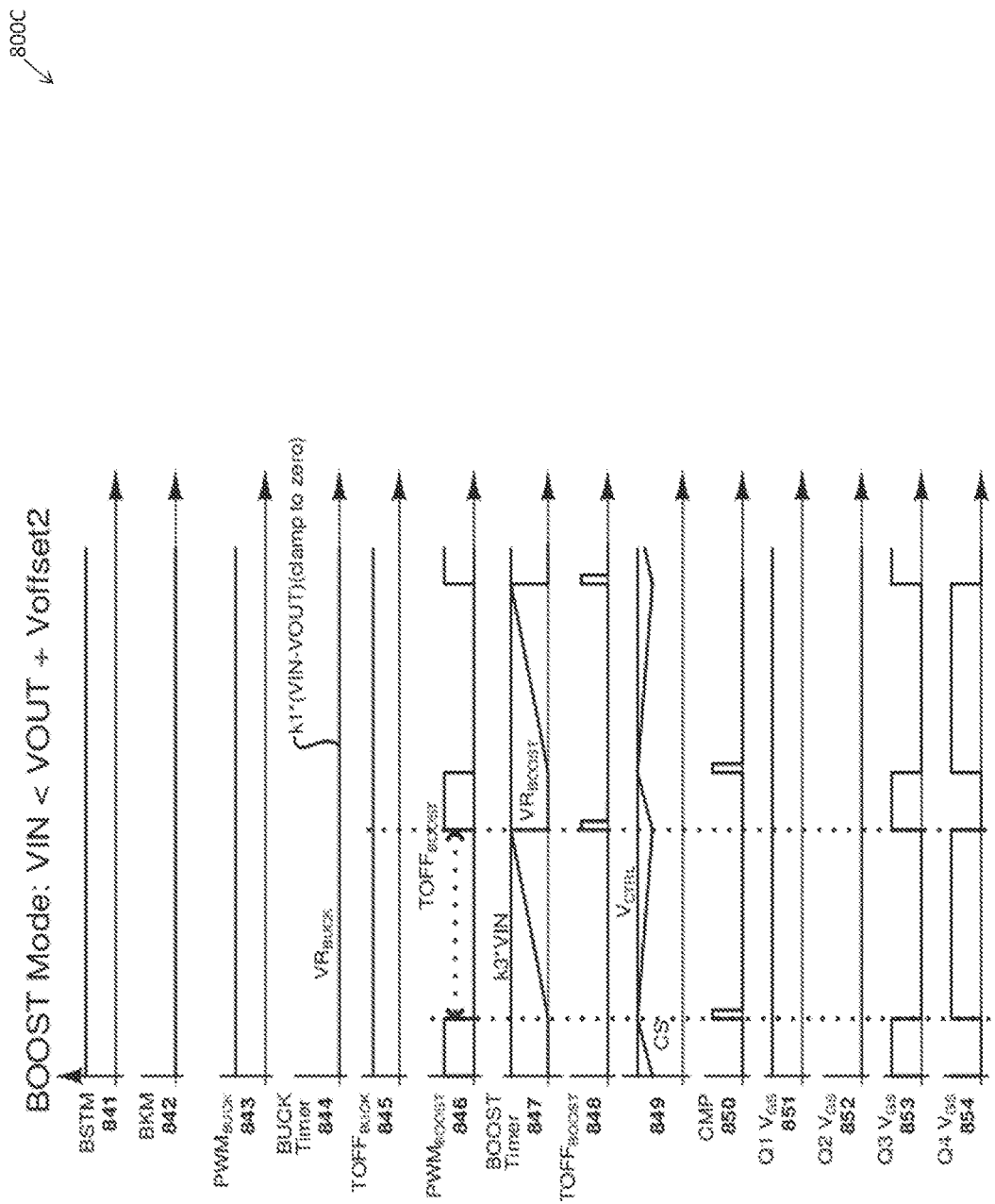

In FIG. 7, when VIN is higher than VOUT+VOFFSET2, the converter 500 disenables the BOOST mode and only enables switching Q1 502 and Q2 503. In this scenario, Q3 506 is in OFF state while Q4 505 is in ON state all the time. When VIN becomes lower than VOUT−VOFFSET1, the converter 500 will disenable the BUCK mode and only enables switching Q3 506 and Q4 505. In this scenario, Q1 502 is in ON state while Q2 503 is in OFF state. When VIN is between VOUT−VOFFSET1 and VOUT+VOFFSET2, the converter 500 operates in the BUCKBOOST mode, and enables switching all four switches during each switching cycle. Waveforms of the exemplary COT BUCKBOOST converter 500 are illustrated in FIGS. 8A-8C.

In this implementation, the converter 500 determines operation mode using comparators 551 and 553 instead of capacitance and current source. Thus, operation modes can be controlled with more accurately with a smaller circuit size.

Although only certain components are shown within the exemplary systems 200-800 in FIGS. 2-8, respectively, various types of electronic or computing components that are capable of processing or storing data, or receiving or transmitting signals, can also be included in the exemplary systems 200-800. Further, the electronic or computing components in the exemplary systems 200-800 can be configured to execute various types of applications.

The above discussion is meant to be illustrative of the principles and various examples of the present disclosure. Numerous variations and modifications will become apparent once the above disclosure is fully appreciated.

Figure 9:
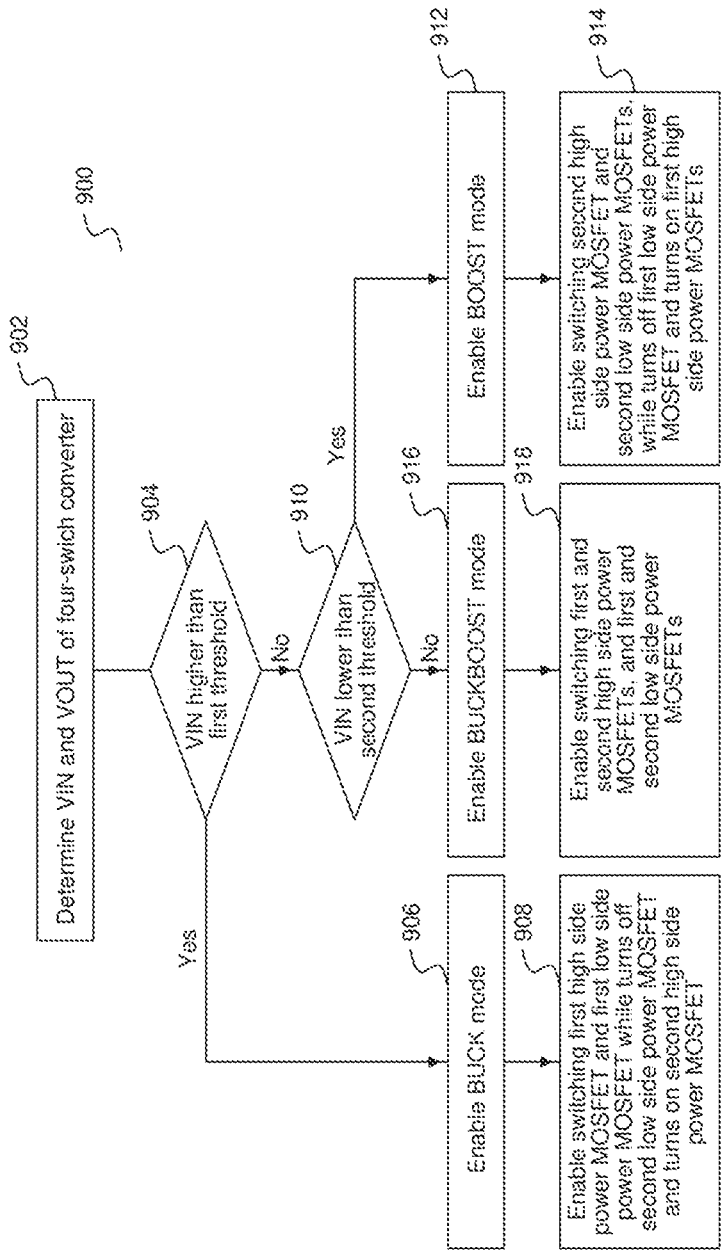
FIG. 9 is an exemplary method for controlling a Constant Off-Time (COT) BUCKBOOST converter of a system, in accordance with an implementation of the present disclosure.

FIG. 9 is an exemplary method 900 for controlling a Constant Off-Time (COT) BUCKBOOST converter of a system, in accordance with an implementation of the present disclosure. It should be understood that the exemplary method 900 is presented solely for illustrative purposes, and that other methods in accordance with the present disclosure can include additional, fewer, or alternative steps performed in similar or alternative orders, or in parallel. The exemplary method 900 starts at step 902 by determining VIN and VOUT of the BUCKBOOST converter. The BUCKBOOST converter comprises four switches (e.g., two high side power MOSFETs and two low side power MOSFETs), a first comparator, a BUCK $T_{off}$ timer, and a BOOST $T_{off}$ timer, as illustrated in FIGS. 2-8. In some implementations, the BUCKBOOST converter further comprises a voltage error amplifier, and a peak current comparator. In some implementations, the BUCKBOOST converter further comprises second and third comparators to determine an operation mode of the BUCKBOOST converter based upon relationship between VIN and VOUT.

At step 904, the system, or a BUCK control logic and a BOOST control logic of the system (hereafter "system"), determines whether VIN of the BUCKBOOST converter is higher than a first threshold voltage. In some implementations, the first threshold voltage is much higher than VOUT of the BUCKBOOST converter. In some implementations, the first threshold voltage is equivalent to VOUT+VOFFSET2. VOFFSET2 is an offset voltage to a third comparator of the BUCKBOOST converter.

At step 906, in an event that VIN is higher than the first threshold voltage, the system enables a BUCK mode for the BUCKBOOST converter. At step 908, the system enables switching first high side power MOSFET and first low side power MOSFET while turns on second high side power MOSFET and turns off second low side power MOSFET, as illustrated in FIGS. 2-8. In some implementations, in the BUCK mode, a current sensing amplifier is configured to detect switch current of the first high side power MOSFET. Off time of the first high side power MOSFET is determined based upon a time when output of the current sensing amplifier reaches a control voltage of the first comparator. When working in the BUCK mode, the BOOST Toff timer is never triggered.

At step 910, the system determines whether VIN of the BUCKBOOST converter is lower than a second threshold voltage. In some implementations, the second threshold voltage is substantially lower than VOUT such that $T_{OFFBUCK}$ reduces to zero. In some implementations, the second threshold voltage is equivalent to VOUT−VOFFSET1. VOFFSET1 is an offset voltage to a second comparator of the BUCKBOOST converter.

At step 912, in an event that VIN is lower than the second threshold voltage, the system enables a BOOST mode for the BUCKBOOST converter. At step 914, the system enables switching second high side power MOSFET and second low side power MOSFET while turns off first low side power MOSFET and turns on first high side power MOSFET, as illustrated in FIGS. 2-8. In the BOOST mode, the BUCK $T_{off}$ timer is in a trigger state to keep the first high side power MOSFET in ON state and the first low side power MOSFET in OFF state.

At step 916, in an event that VIN is between the first threshold voltage and the second threshold voltage, the system enables a BUCKBOOST mode for the BUCKBOOST converter. At step 916, the system enables switching first and second high side power MOSFETs, and first and second low side power MOSFETs, as illustrated in FIGS. 2-8. In some implementations, while in the BUCKBOOST mode, the current sensing amplifier is configured to detect current of a power inductor connected to output of the first high side power MOSFET. When output of the current sensing amplifier reaches the control voltage of the first comparator, both the first high side power MOSFET and the second low side power MOSFET will be turned off while the first low side power MOSFET and the second high side power MOSFET will be turned on. Then, both the BUCK $T_{off}$ timer and the BOOST $T_{off}$ timer start to count. Initially, the BUCK $T_{off}$ timer is triggered, which turns off the first low side power MOSFET and turns on the first high side power MOSFET. After a wait time close to a switching cycle, the BOOST $T_{off}$ timer is triggered, which turns off the second high side power MOSFET and turns on the second low side power MOSFET. Then, another switch cycle starts to repeat.

Figure 10:
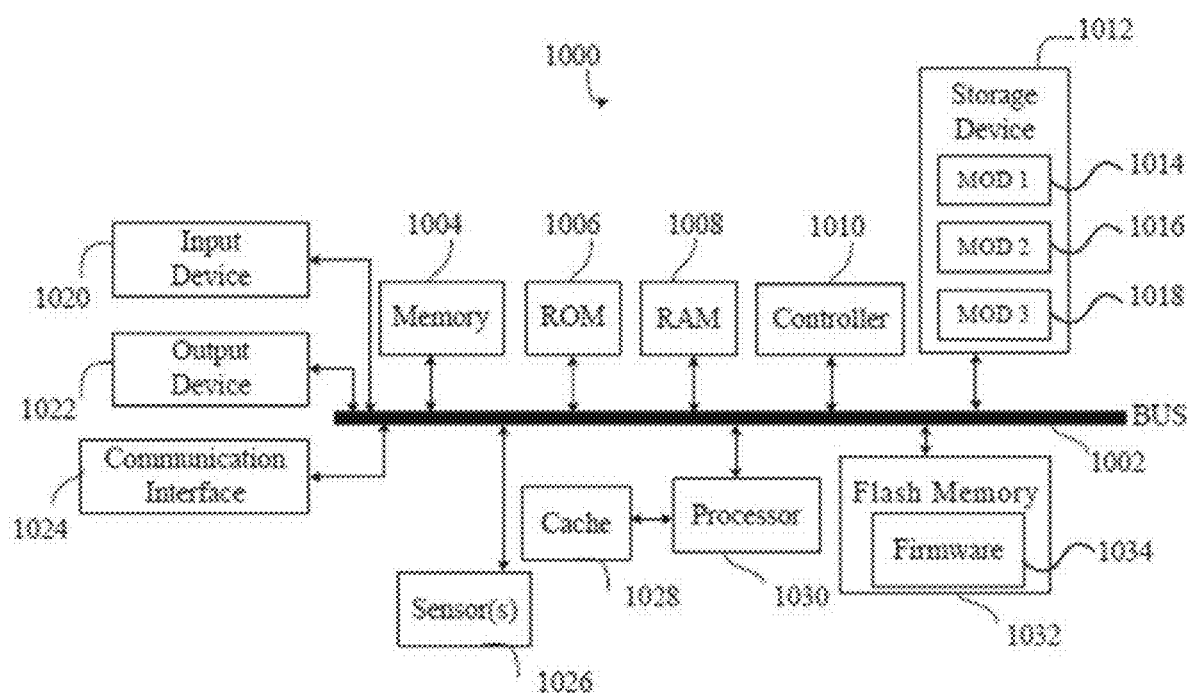
FIG. 10 illustrates an exemplary system, in accordance with various examples of the present disclosure.

A brief introductory description of example system and network, as illustrated in FIG. 10, is disclosed herein. These variations shall be described herein as the various examples are set forth. The present disclosure now turns to FIG. 10.

FIG. 10 illustrates an example computing system 1000, in which components of the computing system are in electrical communication with each other using a bus 1002. The system 1000 includes a processing unit (CPU or processor) 1030, and a system bus 1002 that couples various system components, including the system memory 1004 (e.g., read only memory (ROM) 1006 and random access memory (RAM) 1008), to the processor 1030. The system 1000 can include a cache of high-speed memory that is connected directly with, in close proximity to, or integrated as part of the processor 1030. The system 1000 can copy data from the memory 1004 and/or the storage device 1012 to the cache 1028 for quick access by the processor 1030. In this way, the cache can provide a performance boost for processor 1030 while waiting for data. These and other modules can control or be configured to control the processor 1030 to perform various actions. Other system memory 1004 may be available for use as well. The memory 1004 can include multiple different types of memory with different performance characteristics. The processor 1030 can include any general purpose processor and a hardware module or software module, such as module 1 1014, module 2 1016, and module 3 1018 embedded in storage device 1012. The hardware module or software module is configured to control the processor 1030, as well as a special-purpose processor where software instructions are incorporated into the actual processor design. The processor 1030 may essentially be a completely self-contained computing system that contains multiple cores or processors, a bus, memory controller, cache, etc. A multi-core processor may be symmetric or asymmetric.

To enable user interaction with the computing device 1000, an input device 1020 is provided as an input mechanism. The input device 1020 can comprise a microphone for speech, a touch-sensitive screen for gesture or graphical input, keyboard, mouse, motion input, and so forth. In some instances, multimodal systems can enable a user to provide multiple types of input to communicate with the system 1000. In this example, an output device 1022 is also provided. The communications interface 1024 can govern and manage the user input and system output.

Storage device 1012 can be a non-volatile memory to store data that are accessible by a computer. The storage device 1012 can be magnetic cassettes, flash memory cards, solid state memory devices, digital versatile disks, cartridges, random access memories (RAMs) 1008, read only memory (ROM) 1006, and hybrids thereof.

The controller 1010 can be a specialized microcontroller or processor on the system 1000, such as a BMC (baseboard management controller). In some cases, the controller 1010 can be part of an Intelligent Platform Management Interface (IPMI). Moreover, in some cases, the controller 1010 can be embedded on a motherboard or main circuit board of the system 1000. The controller 1010 can manage the interface between system management software and platform hardware. The controller 1010 can also communicate with various system devices and components (internal and/or external), such as controllers or peripheral components, as further described below.

The controller 1010 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1010 to initiate or conduct specific hardware recovery procedures or operations, as further described below.

The controller 1010 can also include a system event log controller and/or storage for managing and maintaining events, alerts, and notifications received by the controller 1010. For example, the controller 1010 or a system event log controller can receive alerts or notifications from one or more devices and components, and maintain the alerts or notifications in a system event log storage component.

Flash memory 1032 can be an electronic non-volatile computer storage medium or chip that can be used by the system 300 for storage and/or data transfer. The flash memory 1032 can be electrically erased and/or reprogrammed. Flash memory 1032 can include EPROM (erasable programmable read-only memory), EEPROM (electrically erasable programmable read-only memory), ROM, NVRAM, or CMOS (complementary metal-oxide semiconductor), for example. The flash memory 1032 can store the firmware 1034 executed by the system 1000, when the system 1000 is first powered on, along with a set of configurations specified for the firmware 1034. The flash memory 1032 can also store configurations used by the firmware 1034.

The firmware 1034 can include a basic input/output system or equivalents, such as an EFI (Extensible Firmware Interface) or UEFI (Unified Extensible Firmware Interface). The firmware 1034 can be loaded and executed as a sequence program each time the system 1000 is started. The firmware 1034 can recognize, initialize, and test hardware present in the system 1000 based on the set of configurations. The firmware 1034 can perform a self-test, such as a POST (Power-on-Self-Test), on the system 1000. This self-test can test functionality of various hardware components such as hard disk drives, optical reading devices, cooling devices, memory modules, expansion cards, and the like. The firmware 1034 can address and allocate an area in the memory 1004, ROM 1006, RAM 1008, and/or storage device 1012, to store an operating system (OS). The firmware 1034 can load a boot loader and/or OS, and give control of the system 1000 to the OS.

The firmware 1034 of the system 1000 can include a firmware configuration that defines how the firmware 1034 controls various hardware components in the system 1000. The firmware configuration can determine the order in which the various hardware components in the system 1000 are started. The firmware 1034 can provide an interface, such as an UEFI, that allows a variety of different parameters to be set, which can be different from parameters in a firmware default configuration. For example, a user (e.g., an administrator) can use the firmware 1034 to specify clock and bus speeds; define what peripherals are attached to the system 1000; set thresholds of operation parameters (e.g., fan speeds and CPU temperature limits); and/or provide a variety of other parameters that affect overall performance and power usage of the system 1000. While firmware 1034 is illustrated as being stored in the flash memory 1032, one of ordinary skill in the art will readily recognize that the firmware 1034 can be stored in other memory components, such as memory 1004 or ROM 1006.

System 1000 can include one or more sensors 1026. The one or more sensors 1026 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1026 can communicate with the processor, cache 1028, flash memory 1032, communications interface 1024, memory 1004, ROM 1006, RAM 1008, controller 1010, and storage device 1012, via the bus 1002, for example. The one or more sensors 1026 can also communicate with other components in the system via one or more different means, such as inter-integrated circuit (I2C), general purpose output (GPO), and the like. Different types of sensors (e.g., sensors 1026) on the system 1000 can also report to the controller 1010 on parameters, such as cooling fan speeds, power status, operating system (OS) status, hardware status, and so forth.

For clarity of explanation, in some instances, the present disclosure may be presented as including individual functional blocks, such as devices, device components, steps or routines in a method embodied in software, or combinations of hardware and software.

In some implementations, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discreet logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

Figure 11:
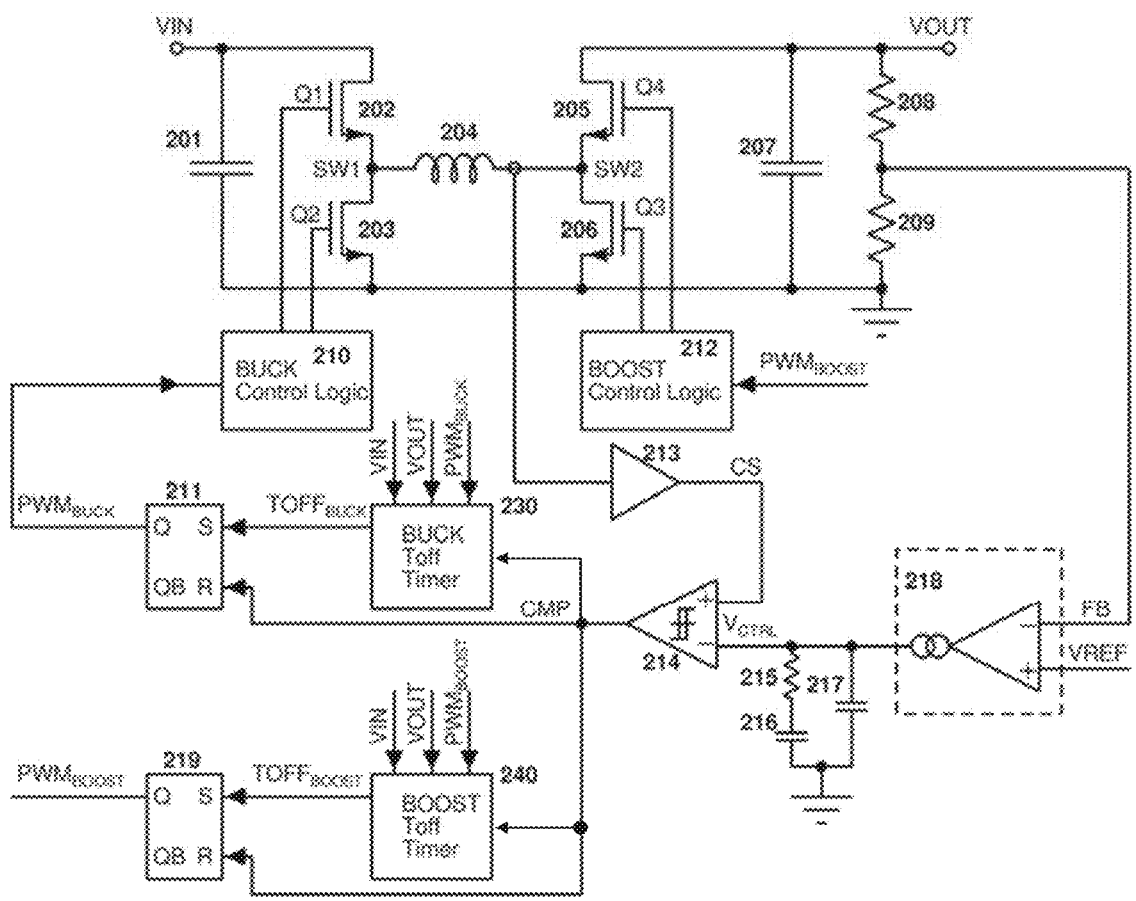
FIG. 11 illustrates a schematic diagram of a buck-boost converter and its associated constant off-time control circuit in accordance with various embodiments of the present disclosure.

FIG. 11 illustrates a schematic diagram of a buck-boost converter and its associated constant off-time control circuit in accordance with various embodiments of the present disclosure. The buck-boost converter comprises a first high-side switch Q1, a first low-side switch Q2, a second low-side switch Q3, a second high-side switch Q4 and an inductor 204. The first high-side switch Q1 and the first low-side switch Q2 are connected in series between the positive terminal and the negative terminal of an input capacitor 201. The second high-side switch Q4 and the second low-side switch Q3 are connected in series between the positive terminal and the negative terminal of an output capacitor 207. The inductor 204 is coupled between the common node of the first high-side switch Q1 and the first low-side switch Q2, and the common node of the second high-side switch Q4 and the second low-side switch Q3.

The buck-boost converter may be divided into two portions, namely a buck converter portion and a boost converter portion. The buck converter portion may comprise the first high-side switch Q1 and the first low-side switch Q2. The buck converter portion and the inductor 204 may function as a step-down converter. On the other hand, the boost converter portion may comprise the second high-side switch Q4 and second low-side switch Q3. The boost converter portion and the inductor 204 may function as a step-up converter. The buck converter portion, the inductor 204 and the boost converter portion are connected in cascade between the input capacitor 201 and the output capacitor 207.

Both the buck converter portion and the boost converter portion of the buck-boost converter are controlled by a constant off-time control circuit. As shown in FIG. 11, the constant off-time control circuit comprises an amplifier 218, a peak current comparator 214, a buck off-time timer 230, a boost off-time timer 240, a first latch 211, a second latch 219, a buck control logic unit 210 and a boost control logic unit 212.

As shown in FIG. 11, the constant off-time control circuit may detect the output voltage VOUT and the current flowing through the inductor 204, and generate a plurality of gate drive signals for driving switches Q1, Q2, Q3 and Q4 accordingly.

In some embodiments, the amplifier 218 is a voltage error amplifier. As shown in FIG. 11, the inverting input (FB) of the amplifier 218 is employed to detect the output voltage VOUT through a voltage divider formed by resistors 208 and 209. The non-inverting input of the amplifier 218 is connected to a predetermined reference VREF. The output of the amplifier 218 is connected to an inverting input of the peak current comparator 214. A compensation network is connected between the output of the amplifier 218 and ground. The compensation network comprises resistor 215, capacitor 216 and capacitor 217. The compensation network helps to stabilize the control loop and provide sufficient phase margin, thereby improving the transient response performance of the buck-boost converter.

The non-inverting input of the peak current comparator 214 is configured to receive the detected current signal (CS). As shown in FIG. 11, the current flowing through the inductor 204 is detected by a suitable current sensing device such as a dc resistance (DCR) current sensing apparatus. The sensed current signal is fed into the non-inverting input of the peak current comparator 214 through a current sensing amplifier 213. The current sensing amplifier 213 is employed to provide a suitable current sensing gain.

The first latch 211 is employed to generate gate drive signals for switches Q1 and Q2. As shown in FIG. 11, the set input of the first latch 211 is configured to receive the output signal of the buck off-time timer 230. The reset input of the first latch 211 is configured to receive the output signal of the peak current comparator 214. The output of the first latch 211 is a PWM signal for controlling the buck converter portion of the buck-boost converter. As shown in FIG. 11, the output of the first latch 211 is applied to the gates of the switches Q1 and Q2 respectively through the buck control logic unit 210. The buck control logic unit 210 is employed to generate a high-side gate drive signal and a low-side gate drive signal based upon the PWM signal generated by the first latch 211. Furthermore, the buck control logic unit 210 adds a suitable delay between the high-side gate drive signal and the low-side gate drive signal. The detailed schematic diagram of the buck off-time timer 230 will be described below with respect to FIG. 12.

The second latch 219 is employed to generate gate drive signals for switches Q3 and Q4. As shown in FIG. 11, the set input of the second latch 219 is configured to receive the output signal of the boost off-time timer 240. The reset input of the second latch 219 is configured to receive the output signal of the peak current comparator 214. The output of the second latch 219 is a PWM signal for controlling the boost converter portion of the buck-boost converter. As shown in FIG. 11, the output of the second latch 219 is applied to the gates of the switches Q3 and Q4 respectively through the boost control logic unit 212. The boost control logic unit 212 is employed to generate a high-side gate drive signal and a low-side gate drive signal based upon the PWM signal generated by the second latch 219. Furthermore, the boost control logic unit 212 adds a suitable delay between the high-side gate drive signal and the low-side gate drive signal. The detailed schematic diagram of the boost off-time timer 240 will be described below with respect to FIG. 12.

It should be noted that while the example throughout the description is based upon a buck-boost converter and a constant off-time control circuit configured to generate gate drive signal for the buck-boost converter (e.g., buck-boost converter shown in FIG. 11), the buck-boost converter as well as the constant off-time control circuit shown in FIG. 11 may have many variations, alternatives, and modifications. For example, the constant off-time control circuit may detect other necessary signals such as the input voltage, the input current and/or the output current of the buck-boost converter. Furthermore, there may be one dedicated driver or multiple dedicated drivers coupled between the constant off-time control circuit and the switches Q1, Q2, Q3 and Q4. In sum, the buck-boost converter and the constant off-time control circuit illustrated herein is limited solely for the purpose of clearly illustrating the inventive aspects of the various embodiments. The present disclosure is not limited to any particular power topology and system configurations.

The switches (e.g., the first high-side switch Q1) shown in FIG. 11 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 11 illustrates four switches Q, Q2, Q3, and Q4, various embodiments of the present disclosure may include other variations, modifications and alternatives. For example, the low-side switch Q2 may be replaced by a freewheeling diode and/or the like. The high-side switch Q4 may be replaced by a rectifier diode and/or the like.

Based upon different design needs and applications, the buck-boost converter may be configured to operate in three different operating modes, namely a buck operating mode, a boost operating mode and a buck-boost operating mode. The detailed operating principles of the three operating modes will be described below with respect to FIGS. 13-15.

In some embodiments, the buck-boost converter is configured to operate in a buck operating mode. In the buck operating mode, Q1 and Q2 are controlled by complementary gate drive signals with appropriate switching dead times in the same manner as in a convention buck converter. Q3 is always off and Q4 is always on. The detailed operating principles of the buck operating mode will be described below with respect to FIG. 13.

In some embodiments, the buck-boost converter is configured to operate in a buck-boost operating mode. In the buck-boost operating mode, Q1 and Q2 are controlled by complementary gate drive signals with appropriate switching dead times in the same manner as in a convention buck converter. Q3 and Q4 are controlled by complementary gate drive signals with appropriate switching dead times in the same manner as in a convention boost converter. The detailed operating principles of the second control mechanism will be described below with respect to FIG. 14.

In some embodiments, the buck-boost converter is configured to operate in a boost operating mode. In the boost operating mode, Q3 and Q4 are controlled by complementary gate drive signals with appropriate switching dead times in the same manner as in a convention boost converter. Q2 is always off and Q1 is always on. The detailed operating principles of the boost operating mode will be described below with respect to FIG. 15.

Figure 12:
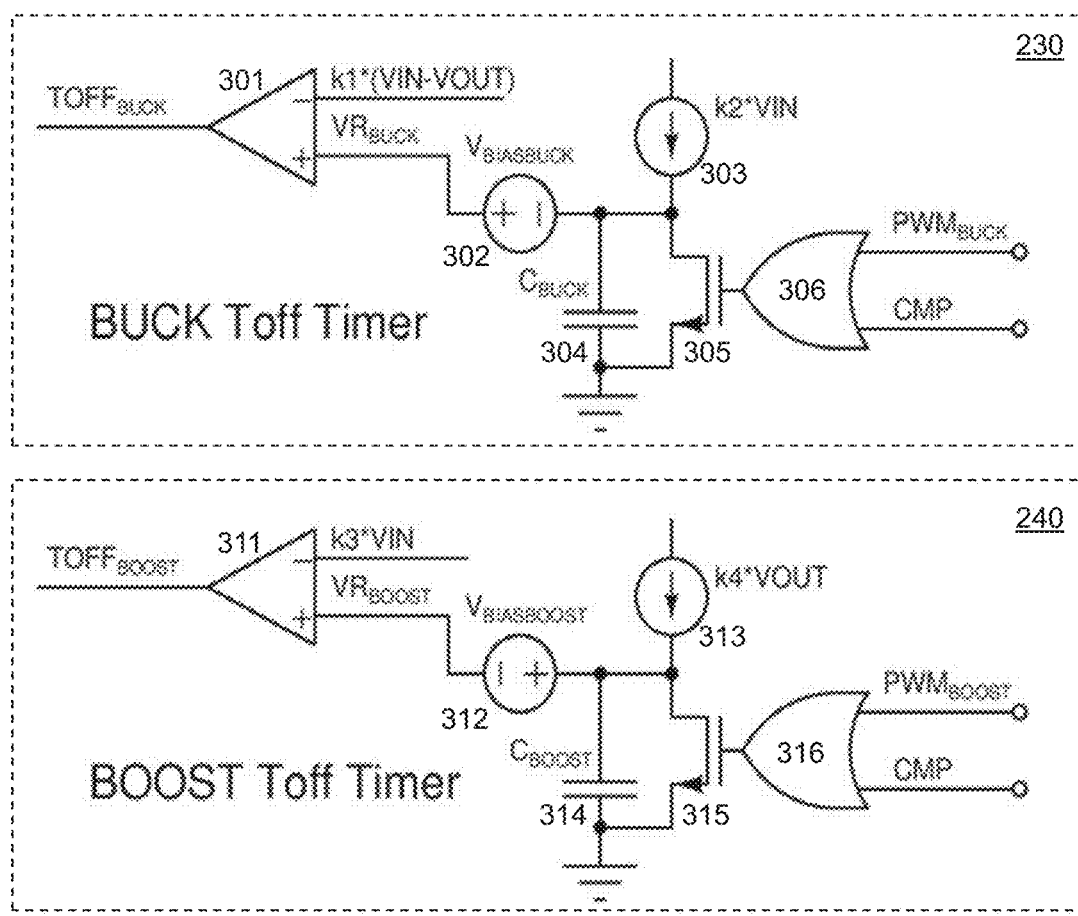
FIG. 12 illustrates schematic diagrams of the buck off-time timer and the boost off-time timer in accordance with various embodiments of the present disclosure.

FIG. 12 illustrates schematic diagrams of the buck off-time timer and the boost off-time timer in accordance with various embodiments of the present disclosure. In some embodiments, the buck off-time timer 230 is configured to calculate the off time of the buck converter portion, and the boost off-time timer 240 is configured to calculate the off time of the boost converter portion.

The buck off-time timer 230 includes a current source 303, a capacitor 304, a switch 305, a comparator 301, an OR gate 306 and a buck bias voltage source 302. As shown in FIG. 12, the current level of the current source 303 is proportional to the input voltage VIN. The current source 303 is used to charge the capacitor 304. The voltage across the capacitor 304 is a voltage ramp.

The sum of the voltage across the capacitor 304 and the buck bias voltage 302 is fed into a non-inverting input of the comparator 301. The inverting input of the comparator 301 is connected to a threshold voltage, which is proportional to a voltage difference between the input voltage and the output voltage. The gate of the switch 305 is controlled by the output signal of the OR gate 306. As shown in FIG. 12, the OR gate 306 is configured to receive the PWM signal generated by the first latch 211 and the CMP signal generated by the peak current comparator 214. The combination of the PWM and CMP signals determines the reset of the capacitor 304.

As shown in FIG. 12, the sum of the voltage across the capacitor 304 and the buck bias voltage 302 is compared with the threshold voltage at the comparator 301. After the sum of the voltage across the capacitor 304 and the buck bias voltage 302 reaches the threshold voltage, the output of the comparator 301 generates a termination signal of the off-time of the buck converter portion (a termination signal of the turn-on of Q2).

The turn-off time of the high-side switch Q1 or the turn-on time of the low-side switch Q2 is determined by the comparison result between the sum of the voltage across the capacitor 304 and the buck bias voltage 302, and the threshold voltage. The off-time of the high-side switch Q1 (or the turn-on time of the low-side switch Q2) satisfies the following equation:

$$T_{OFFBUCK} = C_{BUCK} \cdot \frac{k1 \cdot (VIN - VOUT) + V_{BIASBUCK}}{k2 \cdot VIN}$$

where $C_{BUCK}$ is the capacitance of capacitor 304, and k1 and k2 are predetermined parameters. $V_{BIASBUCK}$ is the voltage of the buck bias voltage source 302.

The boost off-time timer 240 includes a current source 313, a capacitor 314, a switch 315, a comparator 311, an OR gate 316 and a boost bias voltage source 312. As shown in FIG. 12, the current level of the current source 313 is proportional to the output voltage VOUT. The current source 313 is used to charge the capacitor 314. The voltage across the capacitor 314 is a voltage ramp.

The sum of the voltage across the capacitor 314 and the boost bias voltage 312 is fed into a non-inverting input of the comparator 311. The inverting input of the comparator 311 is connected to a threshold voltage, which is proportional to the input voltage VIN. The gate of the switch 315 is controlled by the output signal of the OR gate 316. As shown in FIG. 12, the OR gate 316 is configured to receive the PWM signal generated by the second latch 219 and the CMP signal generated by the peak current comparator 214. The combination of the PWM and CMP signals determines the reset of the capacitor 314.

The sum of the voltage across the capacitor 314 and the boost bias voltage 312 is compared with the threshold voltage at the comparator 311. After the sum of the voltage across the capacitor 314 and the boost bias voltage 312 reaches the threshold voltage, the output of the comparator 311 generates a termination signal of the off-time of the boost converter portion.

The turn-off time of the low-side switch Q3 or the turn-on time of the high-side switch Q4 is determined by the comparison result between the sum of the voltage across the capacitor 314 and the boost bias voltage 312, and the threshold voltage. The off-time of the low-side switch Q3 (or the turn-on time of the high-side switch Q4) satisfies the following equation:

$$T_{OFFBOOST} = C_{BOOST} \cdot \frac{k3 \cdot VIN + V_{BIASBOOST}}{k4 \cdot VOUT}$$

where $C_{BOOST}$ is the capacitance of capacitor 314, and k3 and k4 are predetermined parameters. $V_{BIASBOOST}$ is the voltage of the boost bias voltage 312.

In the equations above, k1 and k3 are voltage scaling factors, and k2 and k4 are voltage to current scaling factors. By choosing different scaling factors, $T_{OFFBUCK}/T_{OFFBOOST}$ and corresponding switching frequency can be adjusted accordingly.

In some embodiments, the buck bias voltage 302 and the boost bias voltage 312 are employed to achieve automatic transitions among different operating modes, namely the buck operating mode, the buck-boost operating mode and the boost operating mode.

Figure 13:
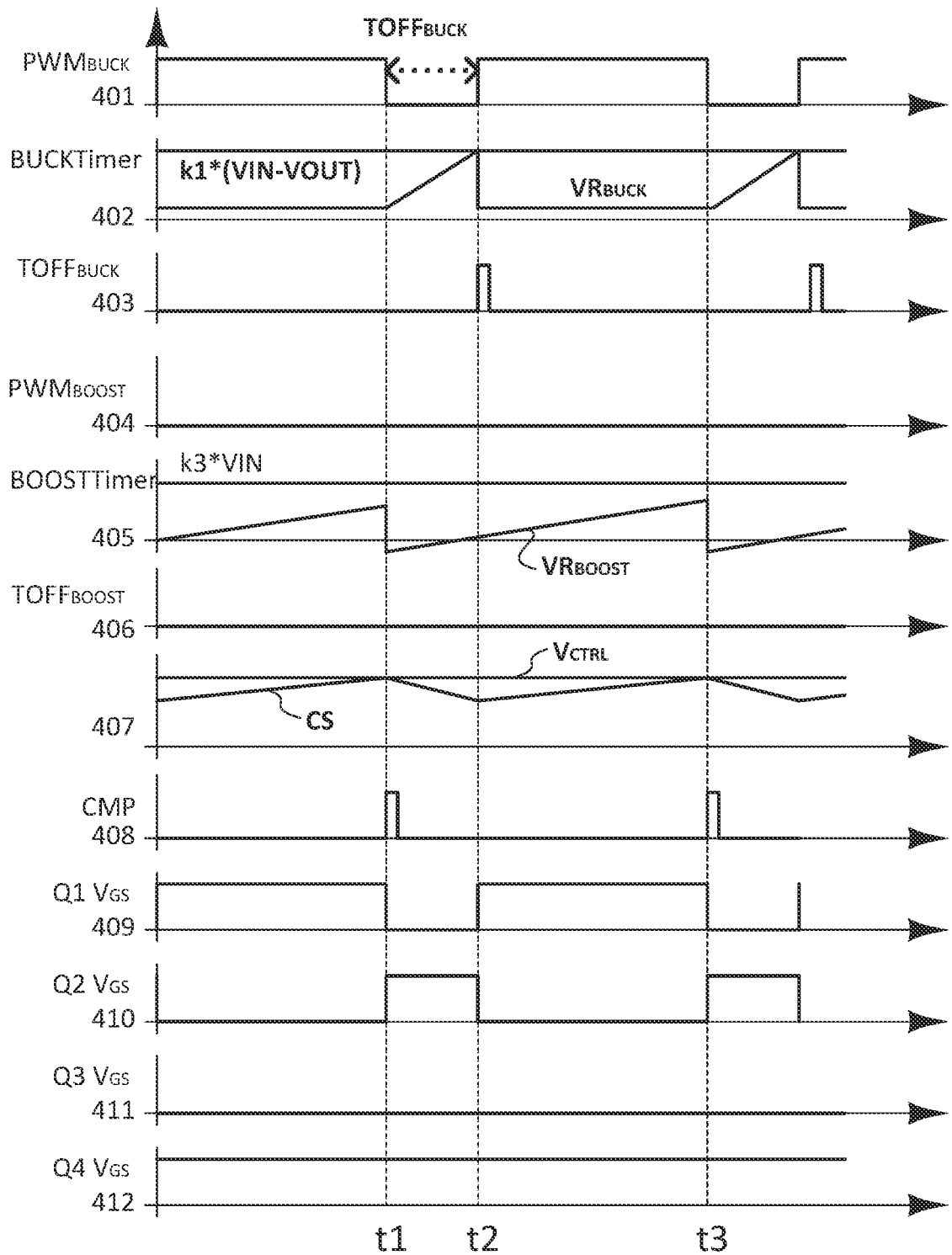
FIG. 13 illustrates timing diagrams associated with the buck operating mode of the buck-boost converter shown in FIG. 11 in accordance with various embodiments of the present disclosure.

FIG. 13 illustrates timing diagrams associated with the buck operating mode of the buck-boost converter shown in FIG. 11 in accordance with various embodiments of the present disclosure. The horizontal axis of FIG. 13 represents intervals of time. There are twelve rows. The first row 401 represents the PWM signal generated by the first latch 211. The second row 402 represents the threshold voltage and the ramp fed into the comparator 301. The third row 403 represents the output voltage of the comparator 301. The fourth row 404 represents the PWM signal generated by the second latch 219. The fifth row 405 represents the threshold voltage and the ramp fed into the comparator 311. The sixth row 406 represents the output voltage of the comparator 311. The seventh row 407 represents the detected current signal and the error amplifier voltage fed into the peak current comparator 214. The eighth row 408 represents the output voltage of the peak current comparator 214. The ninth row 409 represents the gate drive signal of the switch Q1. The tenth row 410 represents the gate drive signal of the switch Q2. The eleventh row 411 represents the gate drive signal of the switch Q3. The twelfth row 412 represents the gate drive signal of the switch Q4.

In operation, when the input voltage VIN of the buck-boost converter is much higher than the output voltage VOUT of the buck-boost converter, the off-time of the boost converter portion is much longer than a switching period of the buck-boost converter. Referring to FIG. 12, in the buck operating mode, $VR_{BOOST}$ is always lower than k3·VIN. As a result, the high-side switch Q4 is always on and the low-side switch Q3 is always off. The off-time of the buck converter portion is determined by the buck off-time timer 230. The buck-boost converter operates in the buck operating mode.

Referring back to FIG. 11, in the buck operating mode, the current sensing amplifier 213 is configured to detect the current of Q1 (the current flowing through inductor 204). Q1 is turned off when the output of the current sensing amplifier 213 reaches the control voltage $V_{CTRL}$ of the comparator 214. After Q1 has been turned off, the buck off-time timer 230 starts to count. Once the buck off-time timer 230 triggers, Q2 is turned off and Q1 is turned on again to start another cycle.

FIG. 13 shows a timing diagram illustrating the operation principle of the buck operating mode. At the time instant t1, the output of the current sensing amplifier 213 (CS in FIG. 13) reaches the control voltage $V_{CTRL}$ of the comparator 214. Referring back to FIG. 11, at the time instant t1, the output of the comparator 214 generates a logic level "1" and sends this logic level "1" to the reset input of the first latch 211. According to the operating principle of the R-S latch, the output of the comparator 214 determines the turn-off edge of the gate drive signal of Q1.

As shown in FIG. 13, at the time instant t1, Q1 has been turned off. After a suitable delay, Q2 is turned on. As a result of the turn-on of Q2, the sense current CS decreases in a linear manner from the time instant t1 to the time instant t2. From the time instant t1 to the time instant t2, the control signal $PWM_{BUCK}$ is of a logic low state, which turns off the switch 305 of the ramp generation circuit shown in FIG. 12. As a result, the ramp capacitor 304 is charged, and the voltage across the capacitor 304 increases in a linear manner from the time instant t1 to the time instant t2. During the buck operating mode, the boost off-time timer is never triggered. The boost ramp is reset by the output of the comparator 214 (CMP in FIG. 13).

At the time instant t2, the ramp voltage $VR_{BUCK}$ reaches the threshold voltage. The output of the comparator 301 generates a logic level "1" and sends this logic level "1" to the set input of the first latch 211. According to the operating principle of the R-S latch, the output of the comparator 301 determines the turn-off edge of the gate drive signal of Q2.

As shown in FIG. 13, the logic level "1" and the logic level "0" are applied to the gates of Q1 and Q2 respectively through the buck control logic circuit 210. As a result of the turn-off of Q2 and the turn-on of Q1, the sense current CS increases in a linear manner from the time instant t2 to the time instant t3, and the ramp capacitor 304 is discharged.

At the time instant t3, the output of the current sensing amplifier 213 (CS in FIG. 13) reaches the control voltage $V_{CTRL}$ of the comparator 214 again. The buck-boost converter enters into a new switching period.

Figure 14:
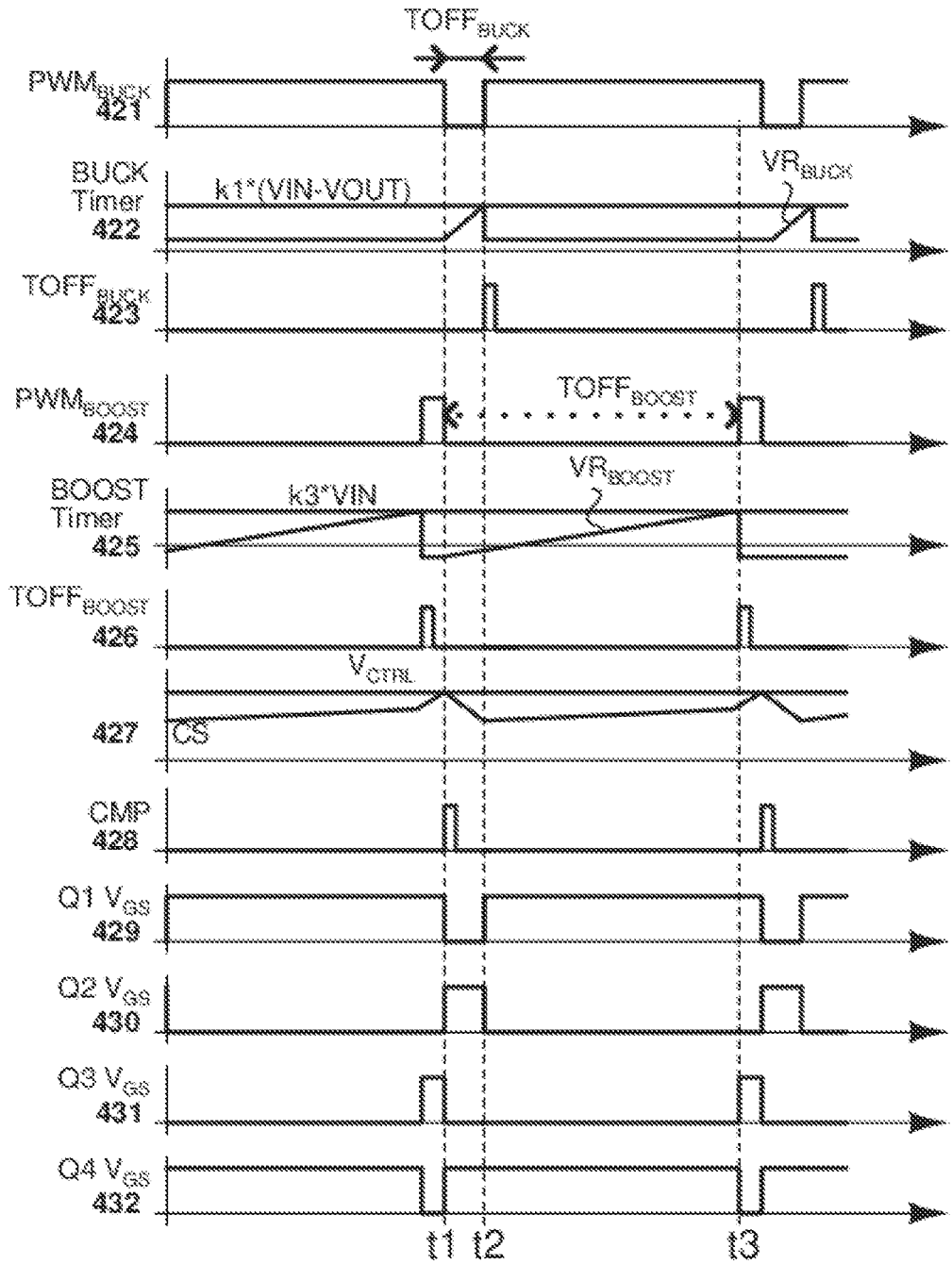
FIG. 14 illustrates timing diagrams associated with the buck-boost operating mode of the buck-boost converter shown in FIG. 11 in accordance with various embodiments of the present disclosure.

FIG. 14 illustrates timing diagrams associated with the buck-boost operating mode of the buck-boost converter shown in FIG. 11 in accordance with various embodiments of the present disclosure. The horizontal axis of FIG. 14 represents intervals of time. There are twelve rows. The first row 421 represents the PWM signal generated by the first latch 211. The second row 422 represents the threshold voltage and the ramp fed into the comparator 301. The third row 423 represents the output voltage of the comparator 301. The fourth row 424 represents the PWM signal generated by the second latch 219. The fifth row 425 represents the threshold voltage and the ramp fed into the comparator 311. The sixth row 426 represents the output voltage of the comparator 311. The seventh row 427 represents the detected current signal and the error amplifier voltage fed into the peak current comparator 214. The eighth row 428 represents the output voltage of the peak current comparator 214. The ninth row 429 represents the gate drive signal of the switch Q1. The tenth row 430 represents the gate drive signal of the switch Q2. The eleventh row 431 represents the gate drive signal of the switch Q3. The twelfth row 432 represents the gate drive signal of the switch Q4.

In operation, when the input voltage VIN drops to a level approximately equal to the output voltage VOUT, the off-time of the boost converter portion is reduced due to the offset voltage VBIASBOOST even when the input voltage VIN is still higher than the output voltage VOUT. When the off-time of the boost converter portion ($T_{OFFBOOST}$) reaches a threshold level, Q4 starts to turn off and Q3 turns on. As a result of turning off Q4 and turning on Q3, the buck-boost converter operates in the buck-boost operating mode.

The timing diagram of FIG. 14 shows the operating principle of the buck-boost operating mode. Prior to the time instant t1, Q1 and Q3 are initially in an ON state. The current flowing through the inductor (CS in FIG. 14) ramps up. At the time instant t1, the sensed current CS reaches the control voltage $V_{CTRL}$, both Q1 and Q3 are turned off as shown in FIG. 14. After a suitable delay, Q2 and Q4 are turned on. At the time instant t1, both the buck off-time timer 230 (shown in FIG. 12) and the boost off-time timer 240 (shown in FIG. 12) start to count. In some embodiments, the off-time of the buck converter portion ($T_{OFFBUCK}$) is much smaller than the off-time of the boost converter portion ($T_{OFFBOOST}$).

As shown in FIG. 14, the buck off-time timer 230 is triggered at the time instant t2. As a result of triggering the buck off-time timer 230, Q2 is turned off and Q1 is turned on at the time instant t2. At the time instant t3, the boost off-time timer 240 is triggered. As a result of triggering the boost off-time timer 240, Q4 is turned off and Q3 is turned on at the time instant t3. Then, another switch cycle starts.

Figure 15:
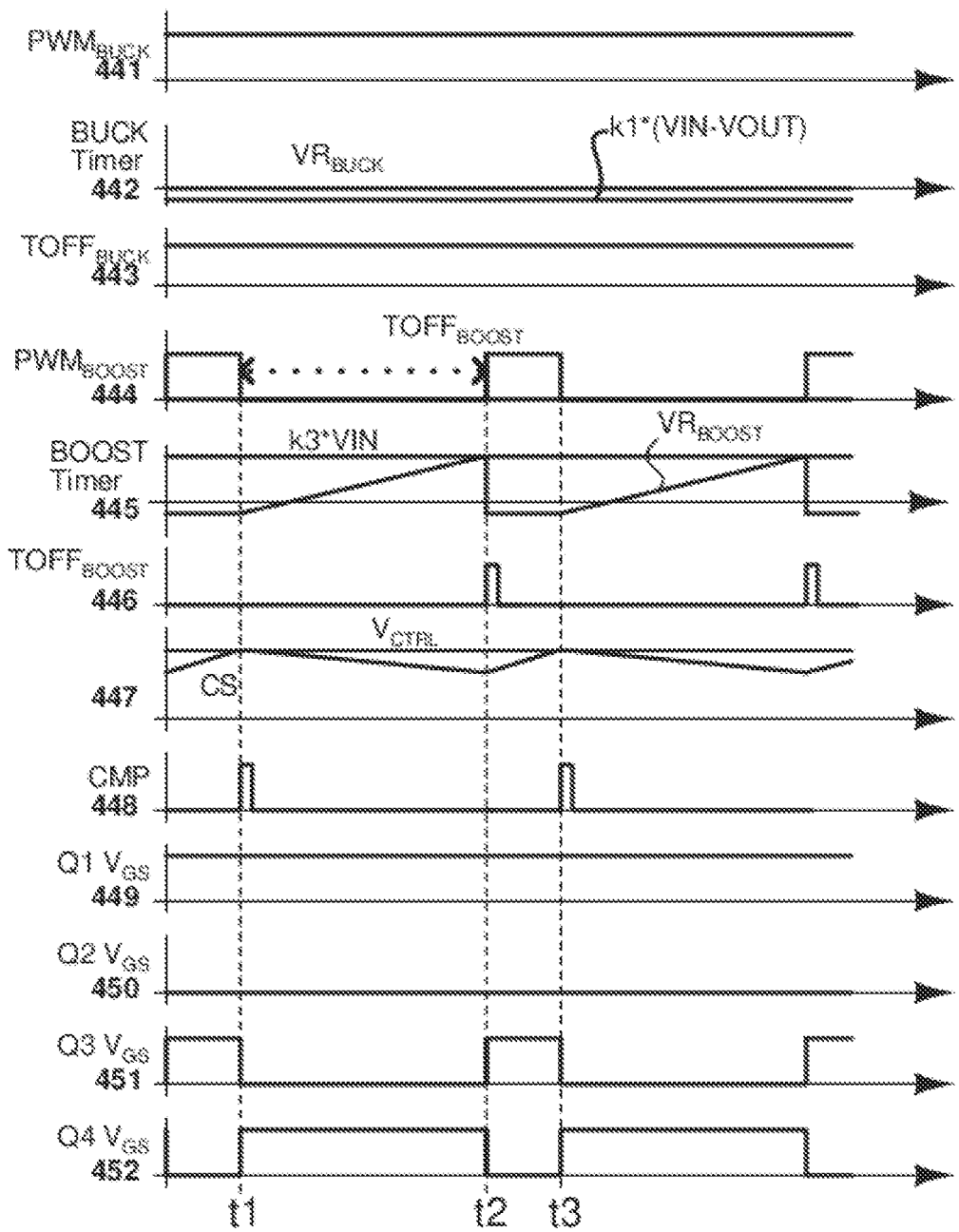
FIG. 15 illustrates timing diagrams associated with the boost operating mode of the buck-boost converter shown in FIG. 11 in accordance with various embodiments of the present disclosure.

FIG. 15 illustrates timing diagrams associated with the boost operating mode of the buck-boost converter shown in FIG. 11 in accordance with various embodiments of the present disclosure. The horizontal axis of FIG. 15 represents intervals of time. There are twelve rows. The first row 441 represents the PWM signal generated by the first latch 211. The second row 442 represents the threshold voltage and the ramp fed into the comparator 301. The third row 443 represents the output voltage of the comparator 301. The fourth row 444 represents the PWM signal generated by the second latch 219. The fifth row 445 represents the threshold voltage and the ramp fed into the comparator 311. The sixth row 446 represents the output voltage of the comparator 311. The seventh row 447 represents the detected current signal and the error amplifier voltage fed into the peak current comparator 214. The eighth row 448 represents the output voltage of the peak current comparator 214. The ninth row 449 represents the gate drive signal of the switch Q1. The tenth row 450 represents the gate drive signal of the switch Q2. The eleventh row 451 represents the gate drive signal of the switch Q3. The twelfth row 452 represents the gate drive signal of the switch Q4.

In operation, the input voltage VIN drops to a predetermined level below the output voltage VOUT. The predetermined level satisfies the following condition: k1·(VIN−VOUT) is less than $V_{BIASBUCK}$. After the input voltage VIN reaches this predetermined level, $TOFF_{BUCK}$ is always high as shown in FIG. 15. As a result, Q1 is always on and Q2 is always off. The buck-boost converter operates in a boost operating mode. Referring back to FIG. 12, it should be noted that $TOFF_{BUCK}$ determines the output of the first latch 211 when both the set and reset terminals of the first latch 211 are of a logic high state.

The timing diagram of FIG. 15 shows the operating principle of the boost operating mode. In the boost operating mode, the buck off-time timer 230 is always in a trigger state because VIN−VOUT is of a negative value as shown in FIG. 15. Since the buck off-time timer 230 is always in the trigger state, Q1 is always on and Q2 is always off.

At the time instant t1, the output of the current sensing amplifier 213 (CS in FIG. 15) reaches the control voltage $V_{CTRL}$ of the comparator 214. As discussed above with respect to FIG. 12, at the time instant t1, the output (CMP in FIG. 15) of the comparator 214 generates a logic level "1" and sends this logic level "1" to the reset input of the second latch 219 (shown in FIG. 11). According to the operating principle of the R-S latch, the output of the comparator 214 determines the turn-off edge of the gate drive signal of Q3.

As shown in FIG. 15, at the time instant t1, Q3 has been turned off. After a suitable delay, Q4 is turned on. As a result of the turn-on of Q4, the sense current CS decreases in a linear manner from the time instant t1 to the time instant t2. From the time instant t1 to the time instant t2, the control signal $PWM_{BOOST}$ is of a logic low state, which turns off the switch 315 of the ramp generation circuit shown in FIG. 12. As a result, the ramp capacitor 314 is charged, and the voltage across the capacitor 314 increases in a linear manner from the time instant t1 to the time instant t2.

At the time instant t2, the ramp voltage $VR_{BOOST}$ reaches the threshold voltage. The output ($TOFF_{BOOST}$) of the comparator 311 generates a logic level "1" and sends this logic level "1" to the set input of the second latch 219. According to the operating principle of the R-S latch, the output ($TOFF_{BOOST}$) of the comparator 311 determines the turn-off edge of the gate drive signal of Q4.

As shown in FIG. 15, the logic level "1" and the logic level "0" are applied to the gates of Q3 and Q4 respectively through the boost control logic circuit 212. As a result of the turn-off of Q4 and the turn-on of Q3, the sense current CS increases in a linear manner from the time instant t2 to the time instant t3. The ramp capacitor 314 is discharged at the time instant t2. At the time instant t3, the output of the current sensing amplifier 213 (CS in FIG. 13) reaches the control voltage $V_{CTRL}$ of the comparator 214 again. The buck-boost converter enters into a new switching period.

Figure 16:
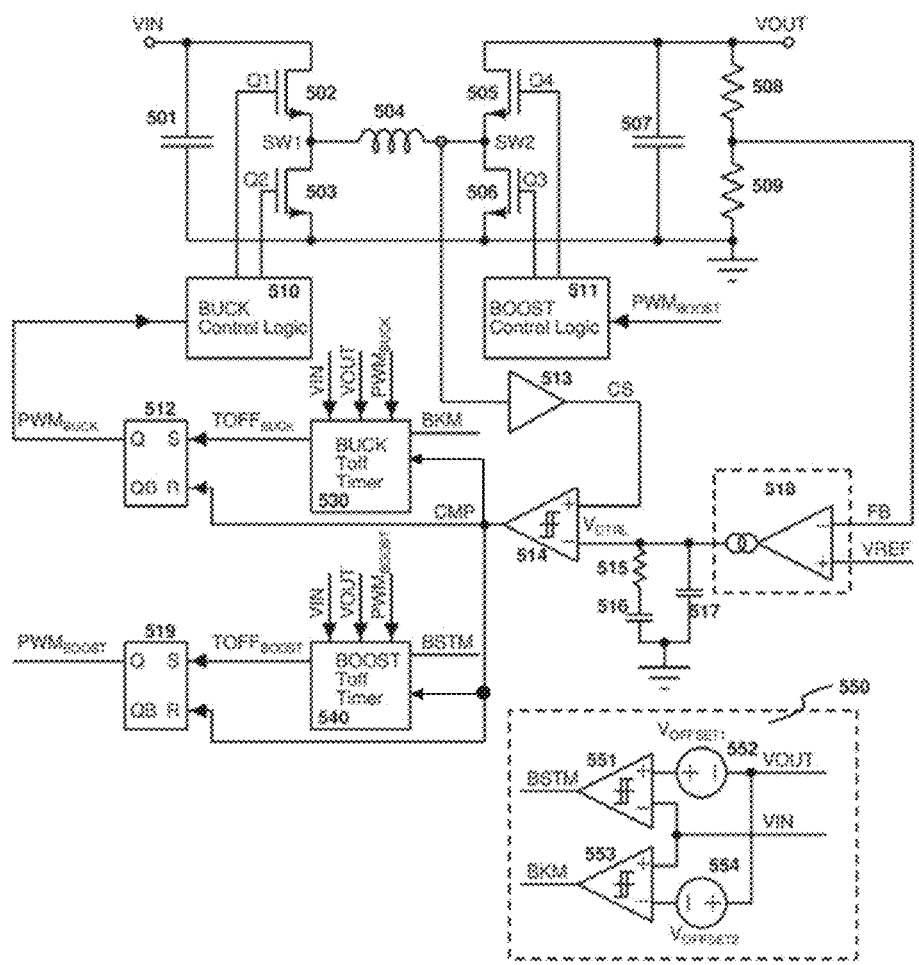
FIG. 16 illustrates a schematic diagram of another buck-boost converter and its associated constant off-time control circuit in accordance with various embodiments of the present disclosure.

FIG. 16 illustrates a schematic diagram of another buck-boost converter and its associated constant off-time control circuit in accordance with various embodiments of the present disclosure. The buck-boost converter shown in FIG. 16 is similar to that shown in FIG. 11 except that the operating mode transition is determined by a control unit 550. In particular, the control unit 550 determines which operating mode (buck, buck-boost or boost) the buck-boost converter operates in depending on the relationship between the input voltage VIN and the output voltage VOUT.

The control unit 550 comprises a first comparator 551 and a second comparator 553 as shown in FIG. 16. The first comparator 551 has a non-inverting input connected to a sum of the output voltage VOUT and a first offset voltage VOFFSET1. The first comparator 551 has an inverting input connected the input voltage VIN. The output of the first comparator 551 is applied to the control circuit of the boost converter portion of the buck-boost converter based upon the relationship between the input voltage VIN and the output voltage VOUT.

The second comparator 553 has a non-inverting input connected to the input voltage VIN. The second comparator 553 has an inverting input connected to a voltage level equal to the output voltage VOUT minus a second offset voltage VOFFSET2. The output of the second comparator 553 is applied to the control circuit of the buck converter portion of the buck-boost converter based upon the relationship between the input voltage VIN and the output voltage VOUT.

Figure 17:
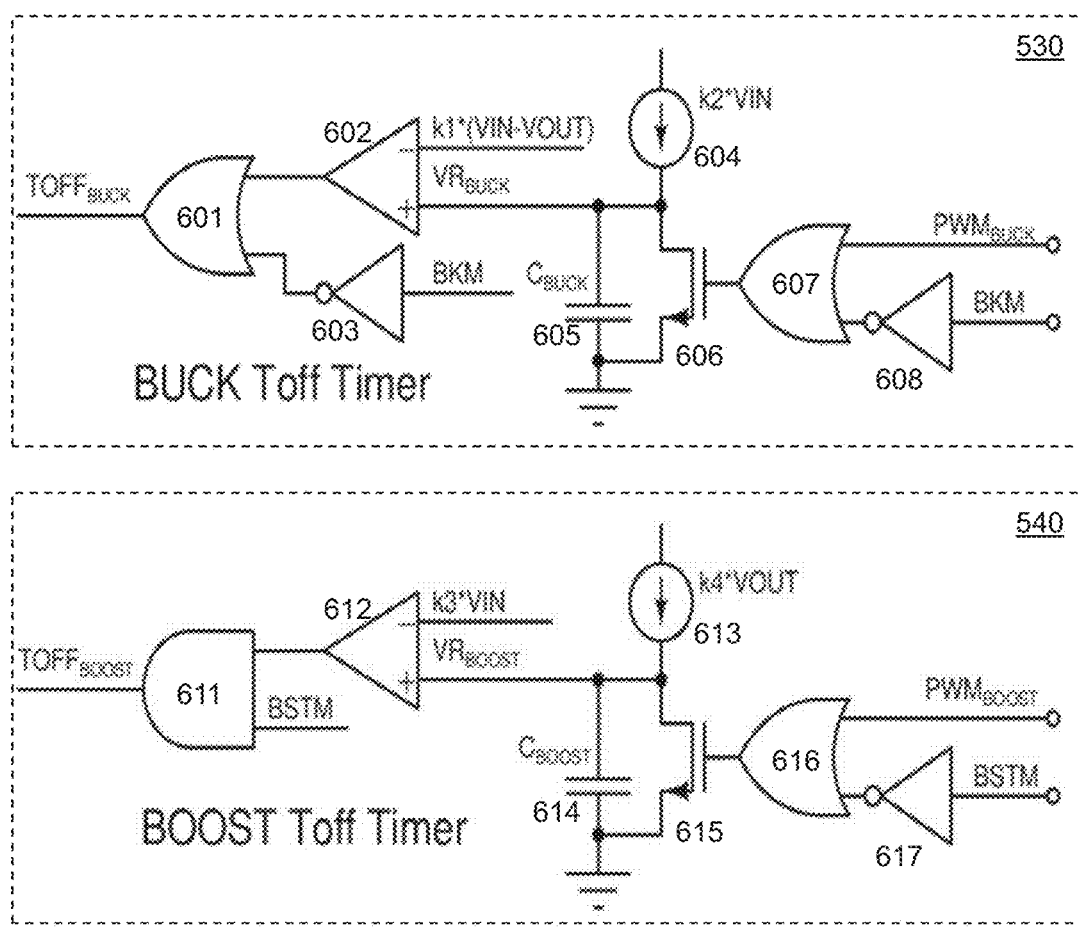
FIG. 17 illustrates schematic diagrams of the buck off-time timer and the boost off-time timer shown in FIG. 16 in accordance with various embodiments of the present disclosure.

FIG. 17 illustrates schematic diagrams of the buck off-time timer and the boost off-time timer shown in FIG. 16 in accordance with various embodiments of the present disclosure. The buck off-time timer 530 and the boost off-time timer 540 are similar to those shown in FIG. 12 except that the outputs of the comparators 551 and 553 are used to determine an operating mode of the buck-boost converter.

As shown in FIG. 17, an OR gate 601 is configured to receive the BKM signal generated by the second comparator 553. The BKM signal is employed to enable the buck converter portion of the buck-boost converter. The BKM signal is also used to reset the ramp capacitor 605. As shown in FIG. 17, the $PWM_{BUCK}$ signal and an inverted BKM signal are fed into an OR gate 607. The output of the OR gate 607 is used to reset the ramp capacitor 605.

As shown in FIG. 17, an AND gate 611 is configured to receive the BSTM signal generated by the first comparator 551. The BSTM signal is employed to enable the boost converter portion of the buck-boost converter. The BSTM signal is also used to reset the ramp capacitor 614. As shown in FIG. 17, the $PWM_{BOOST}$ signal and an inverted BSTM signal are fed into an OR gate 616. The output of the OR gate 616 is used to reset the ramp capacitor 614.

Figure 18:
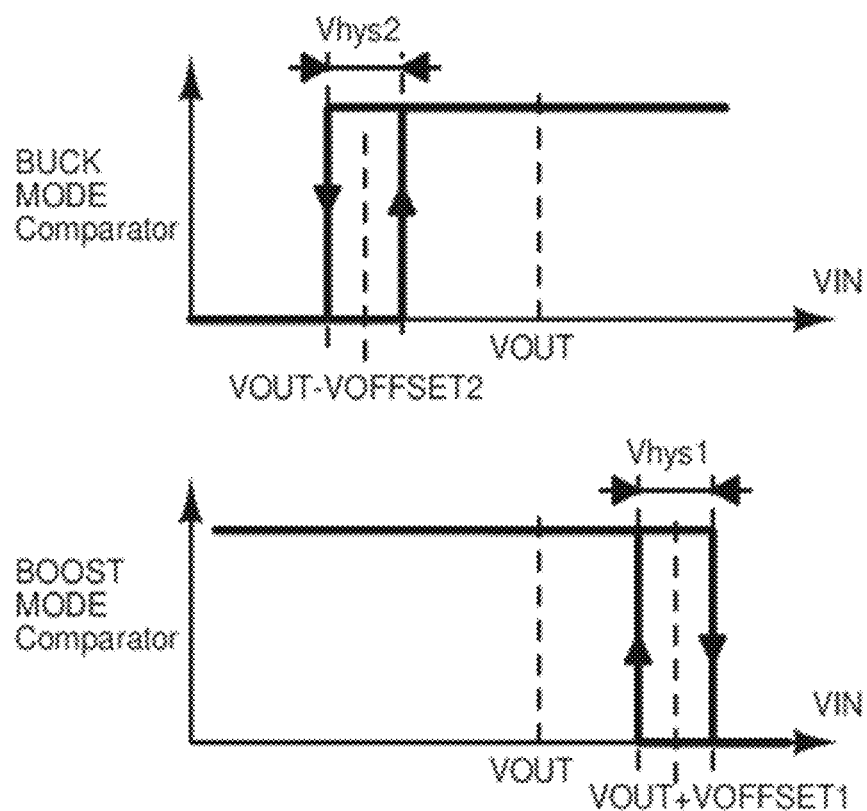
FIG. 18 illustrates the operating principles of the comparators shown in FIG. 16 in accordance with various embodiments of the present disclosure.

FIG. 18 illustrates the operating principles of the comparators shown in FIG. 16 in accordance with various embodiments of the present disclosure. In FIG. 18, when the input voltage VIN is higher than VOUT+VOFFSET1, the buck-boost converter disenables the boost operating mode and operates in the buck operating mode. Referring back to FIG. 16, the control circuit generates a PWM signal (e.g., $PWM_{BUCK}$) and applies the PWM signal to Q1 and Q2. In this operating mode, Q3 is always off and Q4 is always on.

In operation, when the input voltage VIN is lower than VOUT−VOFFSET2, the buck-boost converter disenables the buck operating mode and operates in the boost operating mode. Referring back to FIG. 16, the control circuit generates a PWM signal (e.g., $PWM_{BOOST}$) and applies the PWM signal to Q3 and Q4. In this operating mode, Q2 is always off and Q1 is always on.

In operation, when the input voltage VIN is between VOUT−VOFFSET2 and VOUT+VOFFSET1, the buck-boost converter operates in the buck-boost operating mode. The control circuit enables switching all four switches during each switching cycle.

Figure 19:
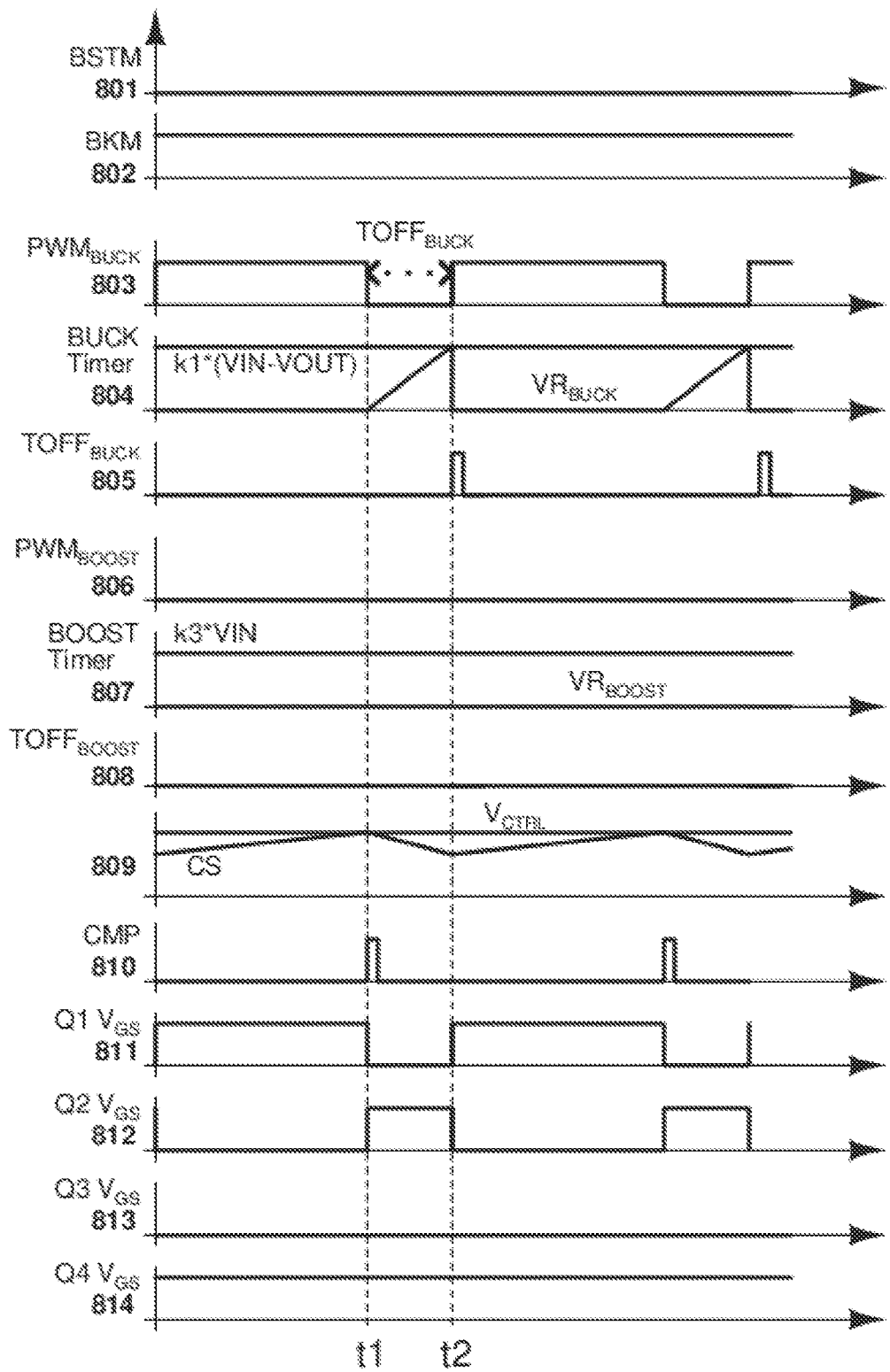
FIG. 19 illustrates timing diagrams associated with the buck operating mode of the buck-boost converter shown in FIG. 16 in accordance with various embodiments of the present disclosure.

FIG. 19 illustrates timing diagrams associated with the buck operating mode of the buck-boost converter shown in FIG. 16 in accordance with various embodiments of the present disclosure. The horizontal axis of FIG. 19 represents intervals of time. There are fourteen rows. The first row 801 represents the BSTM signal generated by the comparator 551. The second row 802 represents the BKM signal generated by the comparator 553. The third row 803 represents the PWM signal generated by the first latch 512. The fourth row 804 represents the threshold voltage and the ramp fed into the comparator 602. The fifth row 805 represents the output voltage of the OR gate 601. The sixth row 806 represents the PWM signal generated by the second latch 519. The seventh row 807 represents the threshold voltage and the ramp fed into the comparator 612. The eighth row 808 represents the output voltage of the AND gate 611. The ninth row 809 represents the detected current signal and the error amplifier voltage fed into the peak current comparator 514. The tenth row 810 represents the output voltage of the peak current comparator 514. The eleventh row 811 represents the gate drive signal of the switch Q1. The twelfth row 812 represents the gate drive signal of the switch Q2. The thirteenth row 813 represents the gate drive signal of the switch Q3. The fourteenth row 814 represents the gate drive signal of the switch Q4.

The timing diagram shown in FIG. 19 is similar to that shown in FIG. 13 except that the BSTM signal and the BKM signal are employed to determine the operating mode of the buck-boost converter. In the buck operating mode, the BSTM signal is of a logic low state as shown in FIG. 19. The BKM signal is of a logic high state as shown in FIG. 19. The logic low state of the BSTM signal is used to disable the boost operating mode. As shown in FIG. 19, the $PWM_{BOOST}$ signal is of a logic low state. Such a logic low state keeps Q3 always off and Q4 always on. The logic high state of the BKM signal is fed into the OR gate 601 through an inverter 603. The inverted BKM signal is a logic low signal, which has no impact on the operation of the buck converter portion.

Figure 20:
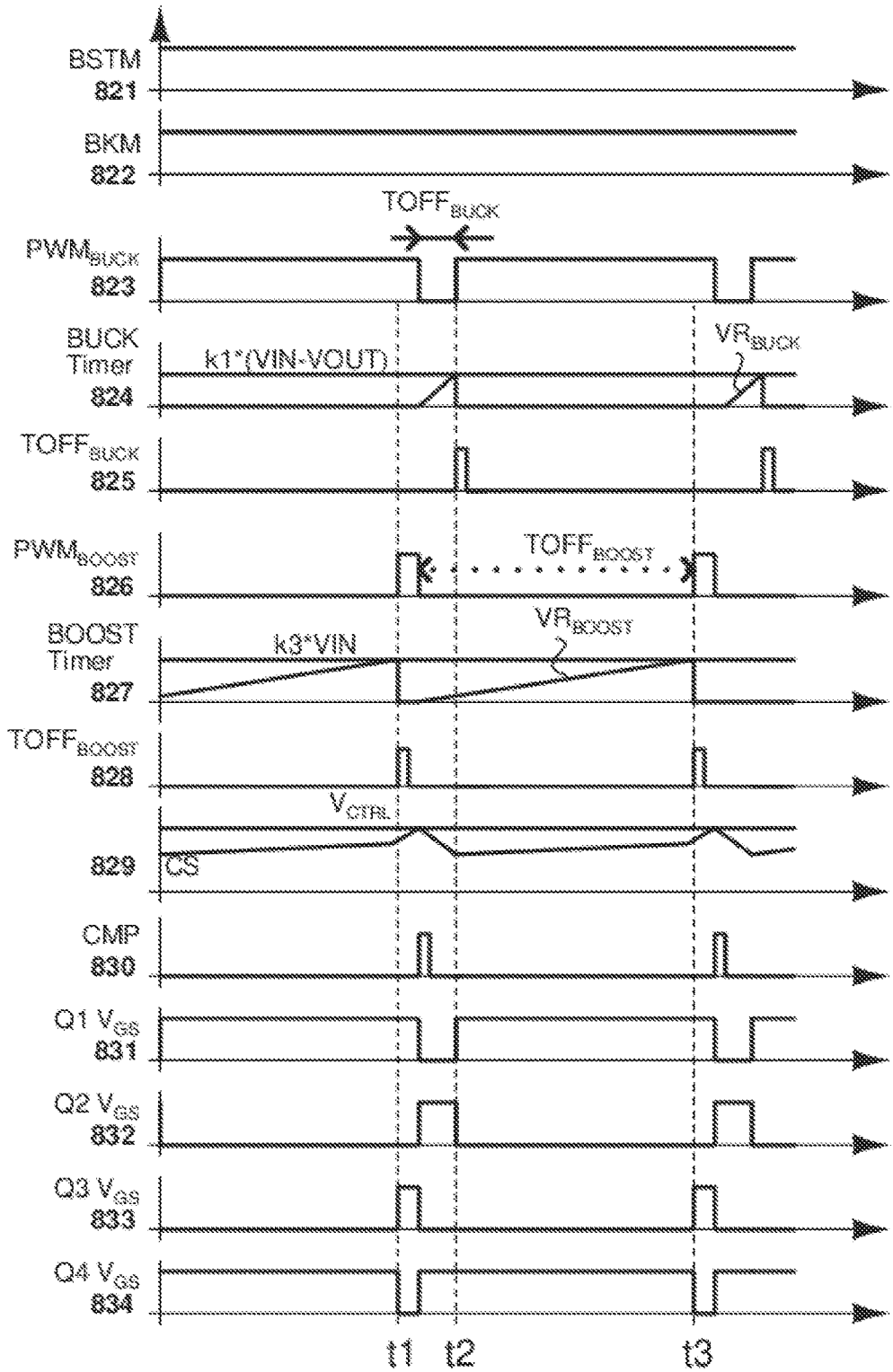
FIG. 20 illustrates timing diagrams associated with the buck-boost operating mode of the buck-boost converter shown in FIG. 16 in accordance with various embodiments of the present disclosure.

FIG. 20 illustrates timing diagrams associated with the buck-boost operating mode of the buck-boost converter shown in FIG. 16 in accordance with various embodiments of the present disclosure. The horizontal axis of FIG. 20 represents intervals of time. There are fourteen rows. The first row 821 represents the BSTM signal generated by the comparator 551. The second row 822 represents the BKM signal generated by the comparator 553. The third row 823 represents the PWM signal generated by the first latch 512. The fourth row 824 represents the threshold voltage and the ramp fed into the comparator 602. The fifth row 825 represents the output voltage of the OR gate 601. The sixth row 826 represents the PWM signal generated by the second latch 519. The seventh row 827 represents the threshold voltage and the ramp fed into the comparator 612. The eighth row 828 represents the output voltage of the AND gate 611. The ninth row 829 represents the detected current signal and the error amplifier voltage fed into the peak current comparator 514. The tenth row 830 represents the output voltage of the peak current comparator 514. The eleventh row 831 represents the gate drive signal of the switch Q1. The twelfth row 832 represents the gate drive signal of the switch Q2. The thirteenth row 833 represents the gate drive signal of the switch Q3. The fourteenth row 834 represents the gate drive signal of the switch Q4.

The timing diagram shown in FIG. 20 is similar to that shown in FIG. 14 except that the BSTM signal and the BKM signal are employed to determine the operating mode of the buck-boost converter. In the buck-boost operating mode, both the BSTM signal and the BKM signal are of a logic high state as shown in FIG. 20. The logic high state of the BSTM signal is used to enable the boost converter portion. As shown in FIG. 20, both Q3 and Q4 are turned on and off in each switching cycle. The logic high state of the BKM signal is used to enable the buck converter portion. As shown in FIG. 20, both Q1 and Q2 are turned on and off in each switching cycle.

Figure 21:
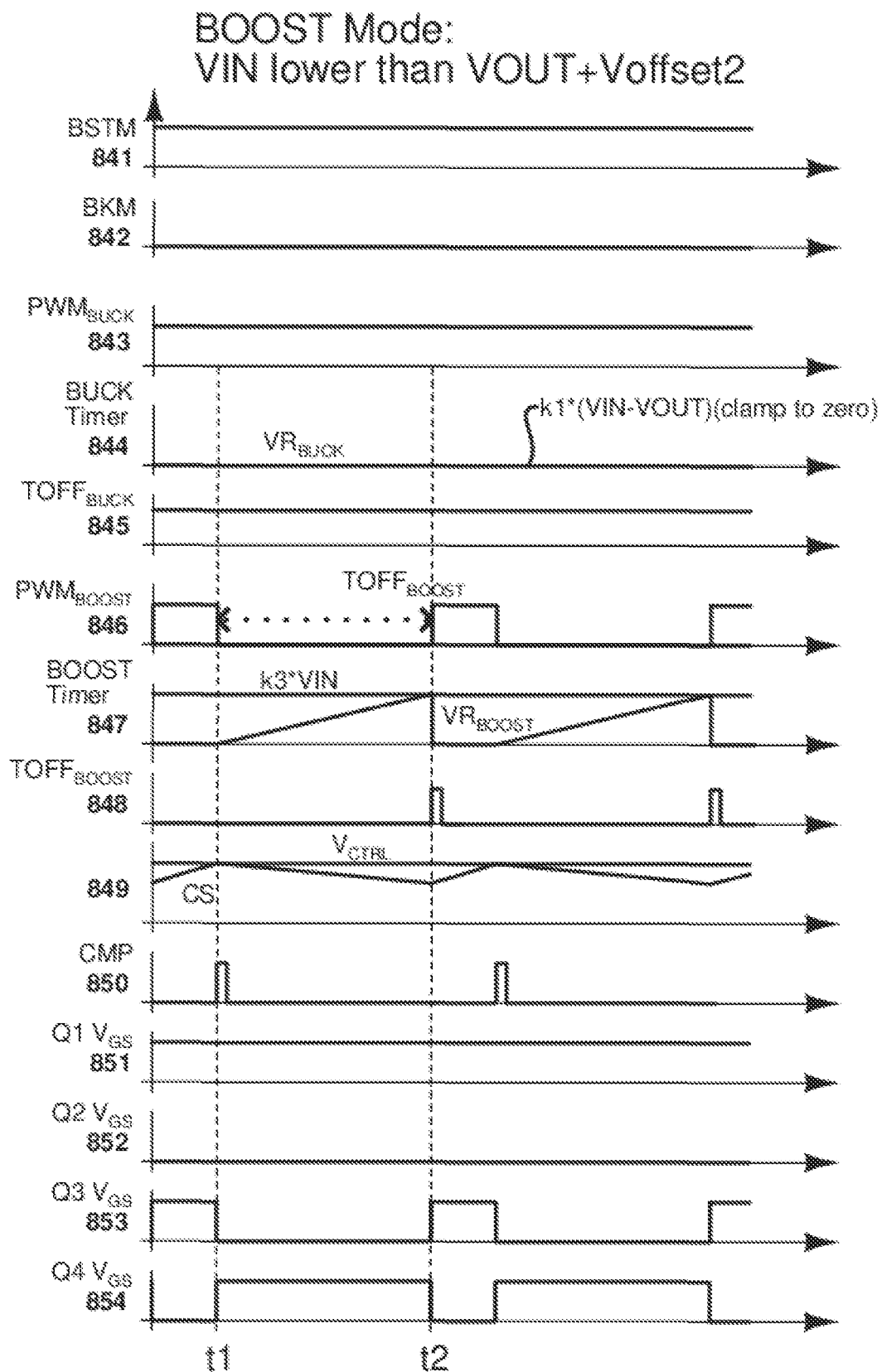
FIG. 21 illustrates timing diagrams associated with the boost operating mode of the buck-boost converter shown in FIG. 16 in accordance with various embodiments of the present disclosure.

FIG. 21 illustrates timing diagrams associated with the boost operating mode of the buck-boost converter shown in FIG. 16 in accordance with various embodiments of the present disclosure. The horizontal axis of FIG. 21 represents intervals of time. There are fourteen rows. The first row 841 represents the BSTM signal generated by the comparator 551. The second row 842 represents the BKM signal generated by the comparator 553. The third row 843 represents the PWM signal generated by the first latch 512. The fourth row 844 represents the threshold voltage and the ramp fed into the comparator 602. The fifth row 845 represents the output voltage of the OR gate 601. The sixth row 846 represents the PWM signal generated by the second latch 519. The seventh row 847 represents the threshold voltage and the ramp fed into the comparator 612. The eighth row 848 represents the output voltage of the AND gate 611. The ninth row 849 represents the detected current signal and the error amplifier voltage fed into the peak current comparator 514. The tenth row 850 represents the output voltage of the peak current comparator 514. The eleventh row 851 represents the gate drive signal of the switch Q1. The twelfth row 852 represents the gate drive signal of the switch Q2. The thirteenth row 853 represents the gate drive signal of the switch Q3. The fourteenth row 854 represents the gate drive signal of the switch Q4.

The timing diagram shown in FIG. 21 is similar to that shown in FIG. 15 except that the BSTM signal and the BKM signal are employed to determine the operating mode of the buck-boost converter. In the boost operating mode, the BSTM signal is of a logic high state as shown in FIG. 21. The BKM signal is of a logic low state as shown in FIG. 21. The logic low state of the BKM signal is used to disable the buck operating mode. As shown in FIG. 21, the $PWM_{BUCK}$ signal is of a logic high state. Such a logic high state keeps Q2 always off and Q1 always on. The logic high state of the BSTM signal is fed into the AND gate 611. The logic high signal of BSTM has no impact on the operation of the boost converter portion.

Figure 22:
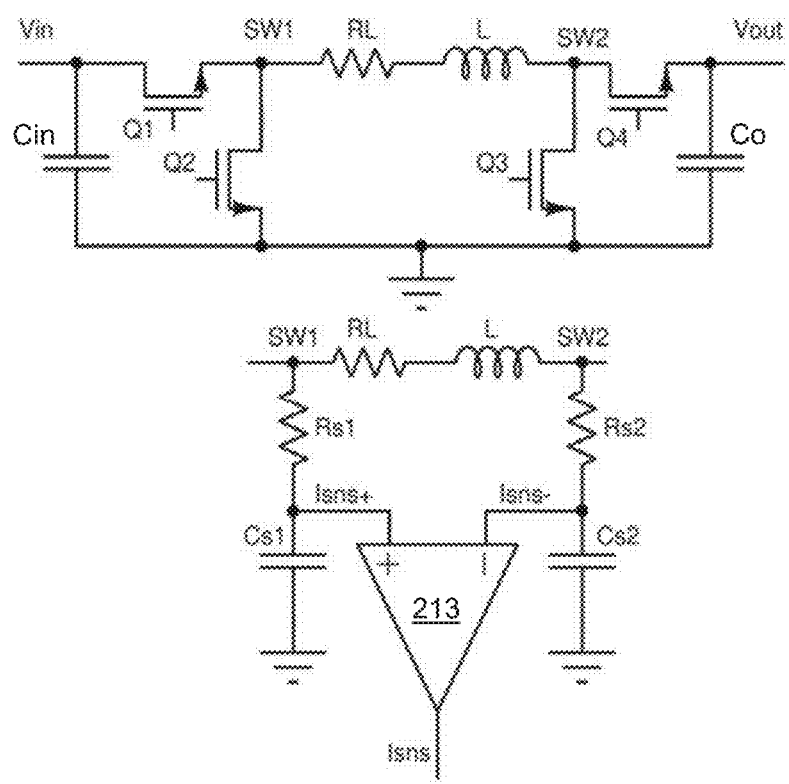
FIG. 22 illustrates a schematic diagram of a first implementation of a current sensing circuit for detecting the current flowing through the inductor of the buck-boost converter in accordance with various embodiments of the present disclosure.

FIG. 22 illustrates a schematic diagram of a first implementation of a current sensing circuit for detecting the current flowing through the inductor of the buck-boost converter in accordance with various embodiments of the present disclosure. Referring back to FIG. 11 and FIG. 16, a current sensing device such as a dc resistance (DCR) current sensing device may be employed to detect the current flowing through the inductor of the buck-boost converter. FIG. 22 illustrates a schematic diagram of a first implementation of the DCR current sensing device. As shown in FIG. 22, the inductor is connected between switching nodes SW1 and SW2. RL represents the equivalent series resistance of the inductor. RL is connected in series with the inductor L as shown in FIG. 22.

The DCR current sensing device comprises Rs1, Rs2, Cs1 and Cs2 as shown in FIG. 22. Rs1 and Cs1 are connected in series between switching node SW1 and ground. Rs2 and Cs2 are connected in series between switching node SW2 and ground. The common node of Rs1 and Cs1 is connected to the non-inverting input of the current sensing amplifier 213. The common node of Rs2 and Cs2 is connected to the inverting input of the current sensing amplifier 213. In some embodiments, the DCR sensing device is integrated with the control circuitry as well as the power devices.

SW1 and SW2 are switching nodes. Rs1, Rs2, Cs1 and Cs2 form two filters, which can filter out the pulsating voltages at SW1 and SW2 and convert the pulsating voltages into suitable dc voltages fed into the current sensing amplifier 213. In order to better attenuate the pulsating voltages, the component values of the two filters are given by the following equations:

$$Rs1 = Rs2 = Rs$$
$$Cs1 = Cs2 = Cs$$
$$Cs = \frac{L}{R_L} \cdot \frac{1}{Rs}$$

In the equations above, L is the inductance of the buck-boost converter. RL is the equivalent series resistance of the inductor. Rs is the resistance value of the sensing resistors (Rs1 and Rs2). Cs is the capacitance value of the sensing capacitors (Cs1 and Cs2). In some embodiments, the voltage between Isns+ and Isns− is proportional to the current flowing through the inductor L.

Figure 23:
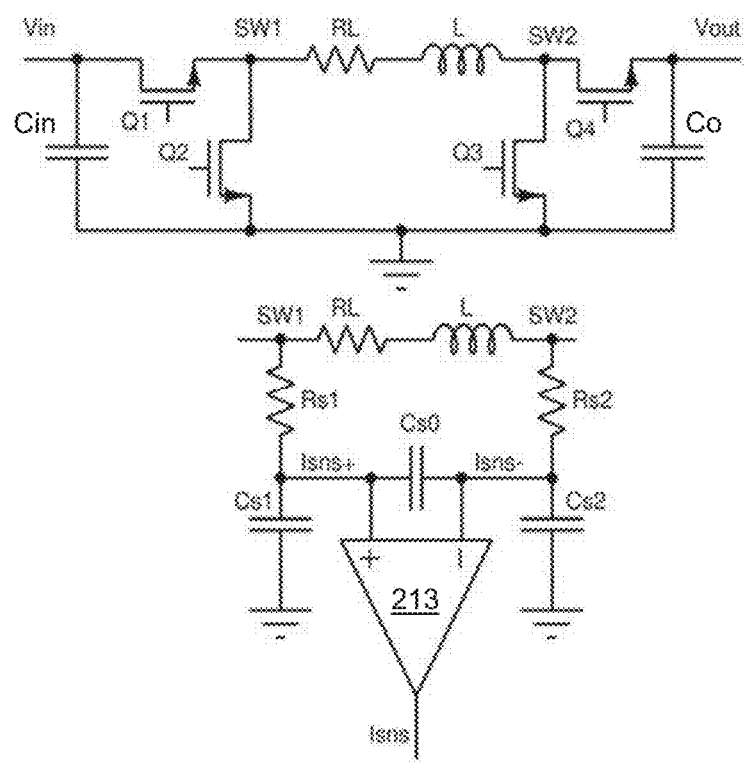
FIG. 23 illustrates a schematic diagram of a second implementation of a current sensing circuit for detecting the current flowing through the inductor of the buck-boost converter in accordance with various embodiments of the present disclosure.

FIG. 23 illustrates a schematic diagram of a second implementation of a current sensing circuit for detecting the current flowing through the inductor of the buck-boost converter in accordance with various embodiments of the present disclosure. The current sensing circuit shown in FIG. 23 is similar to the current sensing circuit shown in FIG. 22 except that a capacitor Cs0 is placed between the two inputs of the current sensing amplifier 213. In this implementation, the component values of the two filters are given by the following equations:

$$Rs1 = Rs2 = Rs$$
$$Cs1 = Cs2$$
$$Cs0 = A \cdot Cs1$$
$$Cs1 = Cs2 = \frac{1}{2} \cdot \frac{L}{R_L} \cdot \frac{1}{Rs} \cdot \frac{A}{A+0.5}$$

One advantageous feature of having Cs0 is that this capacitor helps to reduce the sensing error caused by the mismatch between Cs1 and Cs2. As shown in FIG. 23, capacitors Cs1 and Cs2 are connected to SW1 and SW2 respectively. The mismatch between those two capacitors may cause a significant error to the sensed voltage (the voltage between the two inputs of the current sensing amplifier 213). Since the sensed output is in the range of tens of mV, the performance of the current sensing circuit relies heavily on the matching between the two capacitors (Cs1 and Cs2). Another issue is related to the voltage coefficient of the capacitors. The dc voltage on the capacitors may vary in a wide range in response to different input and output voltages. With different dc bias voltages, the actual capacitance of the ceramic capacitor (e.g., Cs1 and Cs2) may vary significantly.

In the implementation shown in FIG. 23, the ratio of Cs0/Cs1 or Cs0/Cs2 is much greater than 1. In other words, A is much greater than 1. A is a predetermined value. By selecting a suitable A, the mismatch of the voltage coefficient of Cs1 and Cs2 may have a minor impact on the sensing performance. At the same time, the voltage variation on Cs (Cs1 and Cs2) is close to zero. As a result, the DCR sensing circuit does not have the voltage coefficient issue.

Figure 24:
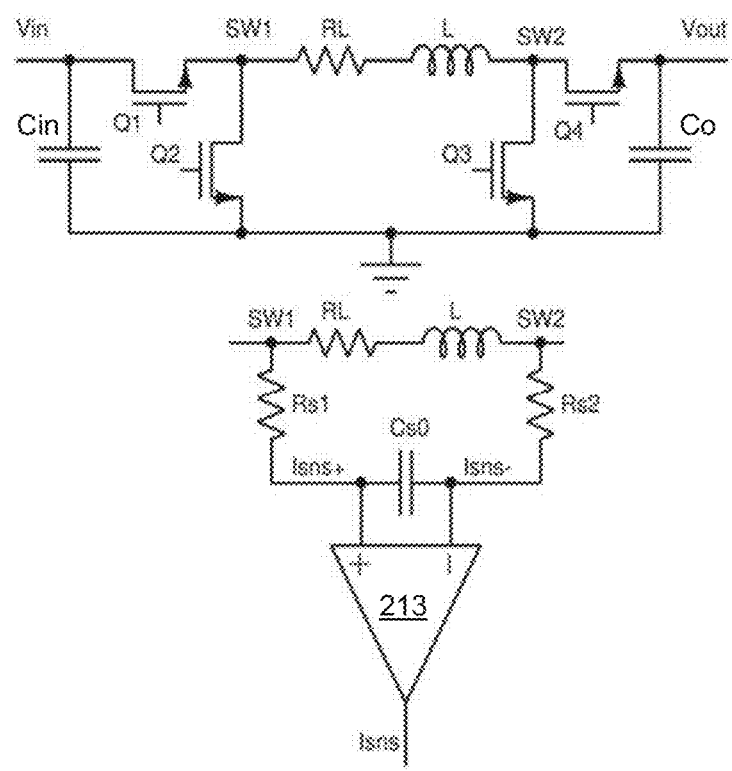
FIG. 24 illustrates a schematic diagram of a third implementation of a current sensing circuit for detecting the current flowing through the inductor of the buck-boost converter in accordance with various embodiments of the present disclosure.

FIG. 24 illustrates a schematic diagram of a third implementation of a current sensing circuit for detecting the current flowing through the inductor of the buck-boost converter in accordance with various embodiments of the present disclosure. The current sensing circuit shown in FIG. 24 is similar to the current sensing circuit shown in FIG. 23 except that the current sensing circuit is further simplified by eliminating Cs1 and Cs2. In this implementation, the component values of the two filters are given by the following equation:

$$Cs0 = \frac{1}{2} \cdot \frac{L}{R_L} \cdot \frac{1}{Rs}$$

In the equation above, Rs is the resistance value of Rs1 and Rs2.

Figure 25:
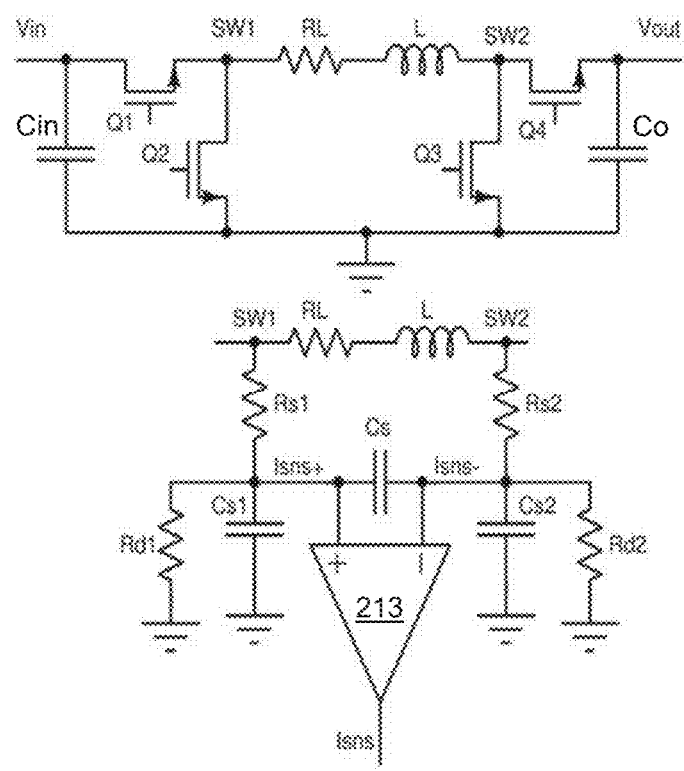
FIG. 25 illustrates a schematic diagram of a fourth implementation of a current sensing circuit for detecting the current flowing through the inductor of the buck-boost converter in accordance with various embodiments of the present disclosure.

FIG. 25 illustrates a schematic diagram of a fourth implementation of a current sensing circuit for detecting the current flowing through the inductor of the buck-boost converter in accordance with various embodiments of the present disclosure. The current sensing circuit shown in FIG. 25 is similar to the current sensing circuit shown in FIG. 23 except that two additional resistors Rd1 and Rd2 are added into the current sensing circuit. With these two resistors, the voltages on Isns+ and Isns− are always lower than the input voltage or the output voltage. This circuit can simplify the design of the current sensing amplifier. The component values of the current sensing circuit are given by the following equation:

$$Rs1 = Rs2 = Rs0$$
$$Rd1 = Rd2 = Rd0$$
$$Cs1 = Cs2$$
$$Cs0 = A \cdot Cs1$$
$$Rs = \frac{Rs0 \cdot Rd0}{Rs0 + Rd0}$$
$$Cs = Cs0 + \frac{Cs1}{2} = (A + 0.5) \cdot Cs1$$
$$Cs = \frac{L}{R_L} \cdot \frac{1}{2 \cdot Rs}$$
$$Cs1 = \frac{Cs}{A + 0.5}$$
$$Cs0 = \frac{A \cdot Cs}{A + 0.5}$$

Figure 26:
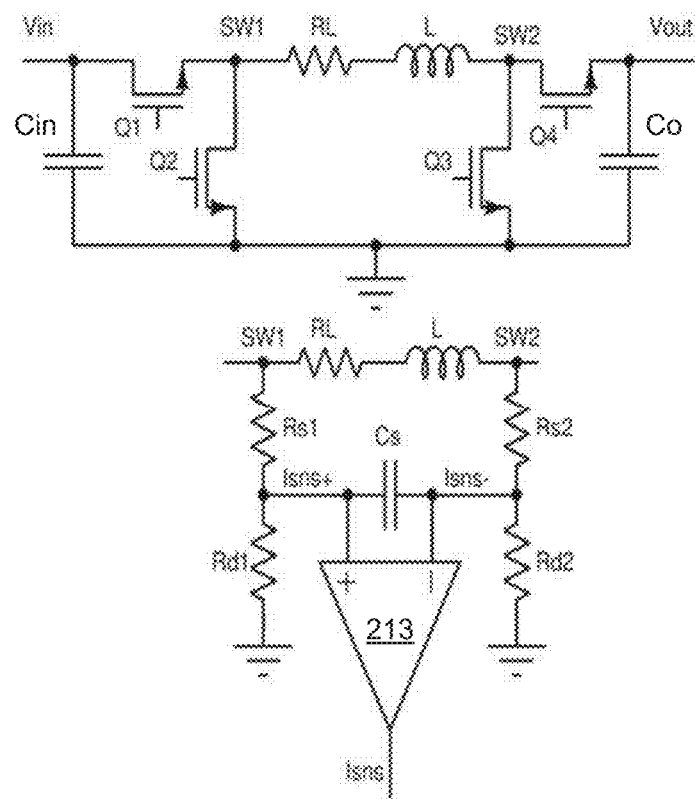
FIG. 26 illustrates a schematic diagram of a fifth implementation of a current sensing circuit for detecting the current flowing through the inductor of the buck-boost converter in accordance with various embodiments of the present disclosure.

FIG. 26 illustrates a schematic diagram of a fifth implementation of a current sensing circuit for detecting the current flowing through the inductor of the buck-boost converter in accordance with various embodiments of the present disclosure. The current sensing circuit shown in FIG. 26 is similar to the current sensing circuit shown in FIG. 25 except that the current sensing circuit has been simplified through eliminating Cs1 and Cs2. Cs0 is determined by the following equation:

$$Cs = \frac{L}{R_L} \cdot \frac{1}{2 \cdot Rs}$$
$$Rs = \frac{Rs0 \cdot Rd0}{Rs0 + Rd0}$$

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a first timer configured to determine a turn-off time of a first high-side switch of a buck-boost converter, wherein a turn-off time of the first high-side switch is a time period from a turn-off time instant of the first high-side switch to an immediately subsequent turn-on time instant of the first high-side switch; and
   a second timer configured to determine a turn-off time of a second low-side switch of the buck-boost converter based on a comparison between a first signal and a second signal, the first signal being equal to a first predetermined constant times an input voltage of the buck-boost converter, and the second signal being generated based on a signal equal to a second predetermined constant times an output voltage of the buck-boost converter, wherein a turn-off time of the second low-side switch is a time period from a turn-off time instant of the second low-side switch to an immediately subsequent turn-on time instant of the second low-side switch.

2. The apparatus of claim 1, wherein:
   the first timer is configured to determine the turn-off time of the first high-side switch of the buck-boost converter based on a comparison between a third signal and a fourth signal, the third signal being proportional to a difference between the input voltage and the output voltage of the buck-boost converter, and the fourth signal being generated based on a signal proportional to the input voltage of the buck-boost converter.

3. The apparatus of claim 2, wherein the first timer comprises a first comparator comprising:
   an inverting input configured to receive the third signal; and
   a non-inverting input configured to receive the fourth signal.

4. The apparatus of claim 2, wherein the first timer further comprises a first bias source, a first current source, a first capacitor, a first switch and a first OR gate, and wherein:

the first current source and the first switch are connected in series;

the first bias source is coupled between the non-inverting input of the first comparator and a common node of the first switch and the first current source;

the first capacitor and the first switch are connected in parallel; and an output of the first OR gate is connected to a gate of the first switch.

5. The apparatus of claim 4, wherein:

a current flowing through the first current source is proportional to the input voltage of the buck-boost converter;

a first input of the first OR gate is configured to receive a gate drive signal for controlling the first high-side switch; and a second input of the first OR gate is configured to receive a control signal for determining a turn-on time of the first high-side switch.

6. The apparatus of claim 4, wherein:

a positive terminal of the first bias source is connected to the non-inverting input of the first comparator; and a negative terminal of the first bias source is connected to the common node of the first switch and the first current source.

7. The apparatus of claim 1, wherein the second timer comprises a second comparator comprising:

an inverting input configured to receive the first signal; and a non-inverting input configured to receive the second signal.

8. The apparatus of claim 7, wherein the second timer further comprises a second bias source, a second current source, a second capacitor, a second switch and a second OR gate, and wherein:

the second current source and the second switch are connected in series;

the second bias source is coupled between the non-inverting input of the second comparator and a common node of the second switch and the second current source;

the second capacitor and the second switch are connected in parallel; and an output of the second OR gate is connected to a gate of the second switch.

9. The apparatus of claim 8, wherein:

a current flowing through the second current source is proportional to the output voltage of the buck-boost converter;

a first input of the second OR gate is configured to receive a gate drive signal for controlling the second low-side switch; and a second input of the second OR gate is configured to receive a control signal for determining a turn-on time of the second low-side switch.

10. The apparatus of claim 8, wherein:

a negative terminal of the second bias source is connected to the non-inverting input of the second comparator; and a positive terminal of the second bias source is connected to the common node of the second switch and the second current source.

11. The apparatus of claim 1, wherein the buck-boost converter comprises:

the first high-side switch and a first low-side switch connected in series between two input terminals of the buck-boost converter;

a second high-side switch and the second low-side switch connected in series between two output terminals of the buck-boost converter; and an inductor connected between a common node of the first high-side switch and the first low-side switch, and a common node of the second high-side switch and the second low-side switch.

12. An apparatus comprising:

a first timer configured to determine a turn-off time of a first high-side switch of a buck-boost converter based on a comparison between a first ramp and a first threshold voltage, wherein the first ramp is generated based on a first current source having a current level equal to a first predetermined constant times an input voltage of the buck-boost converter, and the first threshold voltage is equal to a second predetermined constant times a difference between the input voltage and an output voltage of the buck-boost converter;

a second timer configured to determine a turn-off time of a second low-side switch of the buck-boost converter; and an operation mode control unit comprising a first comparator and a second comparator, wherein:

an output of the first comparator configures the buck-boost converter to operate in a buck mode;

an output of the second comparator configures the buck-boost converter to operate in a boost mode; and a combination of the output of the first comparator and the output of the second comparator configures the buck-boost converter to operate in a buck-boost mode.

13. The apparatus of claim 12, wherein:

the first timer is configured to determine the turn-off time of the first high-side switch of the buck-boost converter based on a comparison between a first signal and a second signal, the first signal being proportional to a difference between an input voltage and an output voltage of the buck-boost converter, and the second signal being generated based on a signal proportional to the input voltage of the buck-boost converter; and the second timer configured to determine the turn-off time of the second low-side switch of the buck-boost converter based on a comparison between a third signal and a fourth signal, the third signal being proportional to the input voltage of the buck-boost converter, and the fourth signal being generated based on a signal proportional to the output voltage of the buck-boost converter.

14. The apparatus of claim 12, wherein:

the first comparator has a non-inverting input configured to receive a sum of the output voltage of the buck-boost converter and a first offset voltage, and an inverting input configured to receive the input voltage of the buck-boost converter; and the second comparator has a non-inverting input configured to receive the input voltage of the buck-boost converter, and an inverting input configured to receive a difference between the output voltage of the buck-boost converter and a second offset voltage.

15. The apparatus of claim 12, wherein the first timer comprises a first turn-off comparator, a first current source, a first capacitor, a first switch, a first OR gate, a first inverter, a second inverter and a second OR gate, and wherein:

the first current source and the first switch are connected in series;

the first capacitor and the first switch are connected in parallel;

an output of the first OR gate is connected to a gate of the first switch;
a first input of the first OR gate is configured to receive a gate drive signal for controlling the first high-side switch;
a second input of the first OR gate is configured to receive the output of the first comparator through the first inverter;
a first input of the second OR gate is connected to an output of the first turn-off comparator;
a second input of the second OR gate is configured to receive the output of the first comparator through the second inverter; and
an output of the second OR gate is configured to generate a signal for determining the turn-off time of the first high-side switch of a buck-boost converter.

16. The apparatus of claim 12, wherein the second timer comprises a second turn-off comparator, a second current source, a second capacitor, a second switch, a third OR gate, an AND gate and a third inverter, and wherein:
the second current source and the second switch are connected in series;
the second capacitor and the second switch are connected in parallel;
an output of the third OR gate is connected to a gate of the second switch;
a first input of the third OR gate is configured to receive a gate drive signal for controlling the second low-side switch;
a second input of the first OR gate is configured to receive the output of the second comparator through the third inverter;
a first input of the AND gate is connected to an output of the second turn-off comparator;
a second input of the AND gate is configured to receive the output of the second comparator; and
an output of the AND gate is configured to generate a signal for determining the turn-off time of the second low-side switch of a buck-boost converter.

17. A method comprising:
determining a turn-off time of a first high-side switch of a buck-boost converter based on a comparison between a first ramp and a first threshold voltage, wherein the first ramp is generated based on a first current source having a current level equal to a first predetermined constant times an input voltage of the buck-boost converter, and the first threshold voltage is equal to a second predetermined constant times a difference between the input voltage and an output voltage of the buck-boost converter, and wherein the turn-off time and a turn-on time of the first high-side switch form a switching cycle of the buck-boost converter; and
determining a turn-off time of a second low-side switch of the buck-boost converter based on a comparison between a second ramp and a second threshold voltage, wherein the second ramp is generated based on a second current source having a current level equal to a third predetermined constant times the output voltage of the buck-boost converter, and the second threshold voltage is equal to a fourth predetermined constant times the input voltage of the buck-boost converter.

18. The method of claim 17, wherein the buck-boost converter comprises:
the first high-side switch and a first low-side switch connected in series between two input terminals of the buck-boost converter;
a second high-side switch and the second low-side switch connected in series between two output terminals of the buck-boost converter; and
an inductor connected between a common node of the first high-side switch and the first low-side switch, and a common node of the second high-side switch and the second low-side switch.

19. The method of claim 17, further comprising:
comparing a detected output voltage of the buck-boost converter with a predetermined reference using an error voltage amplifier;
generating a current sense signal proportional to a current flowing through the inductor of the buck-boost converter;
comparing the current sense signal with an output voltage of the error voltage amplifier; and
determining an on-time of a first high-side switch and an on-time of a second low-side switch of the buck-boost converter based upon comparing the current sense signal and the output voltage of the error amplifier.

20. The method of claim 17, wherein:
generating a boost enable signal based on a comparison between the input voltage of the buck-boost converter with a sum of the output voltage of the buck-boost converter and a first predetermined offset; and
generating a buck enable signal based on a comparison between the input voltage of the buck-boost converter with a difference between the output voltage of the buck-boost converter and a second predetermined offset.

* * * * *